US012629768B2

(12) United States Patent
Khan et al.

(10) Patent No.: US 12,629,768 B2
(45) Date of Patent: May 19, 2026

(54) SOFT TOUCH SOLID-STATE ADDITIVE MANUFACTURING PROCESS AND SYSTEM

(71) Applicant: THE REGENTS OF THE UNIVERSITY OF MICHIGAN, Ann Arbor, MI (US)

(72) Inventors: Abdul Sayeed Khan, Ann Arbor, MI (US); Pingsha Dong, Ann Arbor, MI (US); Lei Zuo, Ann Arbor, MI (US)

(73) Assignee: The Regents of The University of Michigan, Ann Arbor, MI (US)

( * ) Notice: Subject to any disclaimer, the term of this patent is extended or adjusted under 35 U.S.C. 154(b) by 0 days.

(21) Appl. No.: 18/676,312

(22) Filed: May 28, 2024

(65) Prior Publication Data

US 2024/0399491 A1 Dec. 5, 2024

Related U.S. Application Data

(60) Provisional application No. 63/470,196, filed on Jun. 1, 2023.

(51) Int. Cl.
B23K 20/12 (2006.01)
B33Y 30/00 (2015.01)

(52) U.S. Cl.
CPC .......... B23K 20/1215 (2013.01); B33Y 30/00 (2014.12)

(58) Field of Classification Search
CPC .... B23K 20/1215; B23K 20/122–1295; B33Y 30/00; B33Y 10/00
USPC .............................. 228/112.1–114.5, 2.1–2.3
See application file for complete search history.

(56) References Cited

U.S. PATENT DOCUMENTS

| | | | | |
|---|---|---|---|---|
| 5,262,123 | A * | 11/1993 | Thomas ................. | C23C 24/10 |
| | | | | 419/67 |
| 11,311,959 | B2 * | 4/2022 | Hardwick ............. | C22C 1/0416 |
| 12,172,229 | B2 * | 12/2024 | Song ................. | B23K 20/1245 |
| 12,290,873 | B2 * | 5/2025 | Haynie ................ | B33Y 30/00 |
| 2015/0075242 | A1 | 3/2015 | Eller et al. | |
| 2016/0236408 | A1 | 8/2016 | Wolf et al. | |
| 2019/0204811 | A1 * | 7/2019 | Adair .................... | B29C 64/118 |
| 2020/0306869 | A1 * | 10/2020 | Hardwick .......... | B23K 20/1215 |
| 2021/0053283 | A1 | 2/2021 | Liu et al. | |

(Continued)

FOREIGN PATENT DOCUMENTS

| | | | | | |
|---|---|---|---|---|---|
| CN | 204658954 | U | * | 9/2015 | .......... B29C 64/209 |
| CN | 106660267 | B | | 11/2019 | |

(Continued)

OTHER PUBLICATIONS

Cem Altiparmak, et al, Extrusion-based additive manufacturing technologies: State of the art and future perspectives, Journal of Manufacturing Processes, vol. 83, Nov. 2022, pp. 607-636.

(Continued)

*Primary Examiner* — Kiley S Stoner
(74) *Attorney, Agent, or Firm* — Harness, Dickey & Pierce, P.L.C.

(57) ABSTRACT

An additive manufacturing system for additive manufacturing a feedstock material upon a substrate comprising a feedstock supplying system configured to supply the feedstock material; and an extrusion die system having a rotating drive system configured to rotate an extrusion die member relative to and in physical contact with the stationary feedstock material to generate friction sufficient to locally heat the feedstock material.

19 Claims, 24 Drawing Sheets

(56)                References Cited

U.S. PATENT DOCUMENTS

| | | | | | |
|---|---|---|---|---|---|
| 2021/0379825 | A1 * | 12/2021 | Taniguchi | ............ | B29C 64/118 |
| 2022/0018383 | A1 * | 1/2022 | Gonzalez | ............. | B22F 12/224 |
| 2022/0176633 | A1 * | 6/2022 | Hardwick | ............... | B22F 12/88 |
| 2023/0121810 | A1 | 4/2023 | Liu et al. | | |
| 2023/0356322 | A1 * | 11/2023 | Haynie | ................. | B33Y 10/00 |
| 2024/0399491 | A1 * | 12/2024 | Khan | .................... | B33Y 10/00 |

FOREIGN PATENT DOCUMENTS

| | | | | | | |
|---|---|---|---|---|---|---|
| CN | 110834373 | A | * | 2/2020 | ............ | B28B 1/001 |
| CN | 110834373 | B | * | 7/2021 | ............ | B28B 1/001 |
| CN | 113733562 | A | * | 12/2021 | | |
| CN | 113927150 | A | * | 1/2022 | ......... | B23K 20/1245 |
| CN | 114953438 | A | * | 8/2022 | ........... | B29C 64/118 |
| CN | 115008744 | A | * | 9/2022 | | |
| CN | 115091025 | A | | 9/2022 | | |
| CN | 113695597 | B | | 2/2023 | | |
| KR | 10-2016-0111579 | A | | 9/2016 | | |
| KR | 20160128353 | A | * | 11/2016 | | |
| WO | WO-2024086114 | A1 | * | 4/2024 | ............. | B22F 10/25 |

OTHER PUBLICATIONS

Mishra et al, Friction stir-based additive manufacturing, Science and Technology of Welding and Joining vol. 27, 2022—Issue 3.
Turner et al, A review of melt extrusion additive manufacturing processes: I. Process design and modeling, Rapid Prototyping Journal, vol. 20, Issue: 3, pp. 192-204.
What is Material Extrusion? (A Complete Guide)—TWI (twi-global. com).
International Search Report and Written Opinion of the ISA issued in PCT/US2024/031576, mailed Sep. 24, 2024; ISA/KR.

* cited by examiner

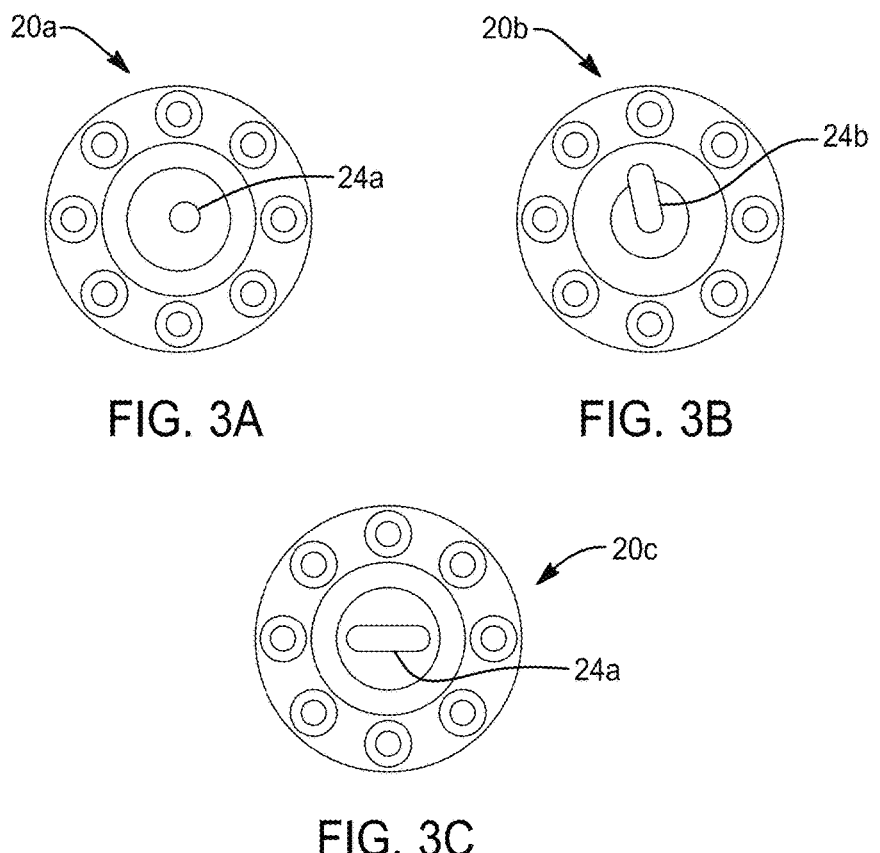
FIG. 3A          FIG. 3B
FIG. 3C
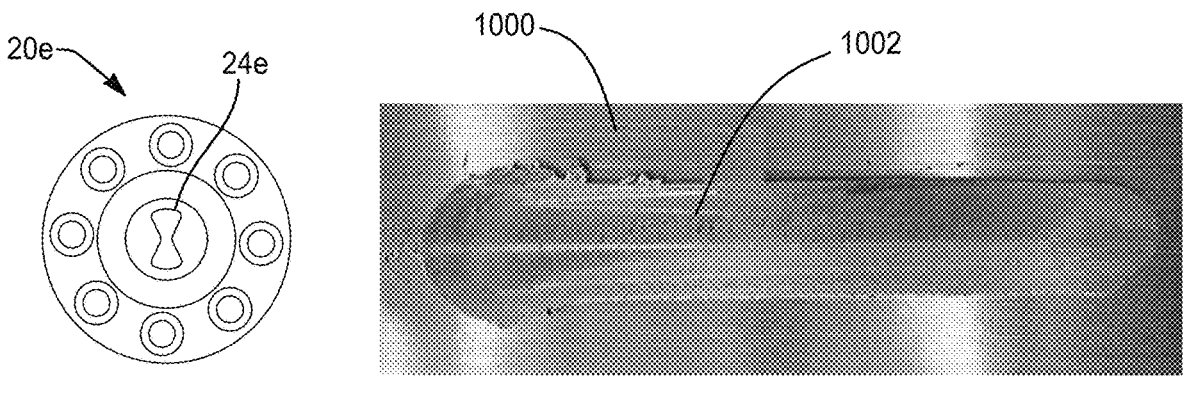
FIG. 4A          FIG. 4B

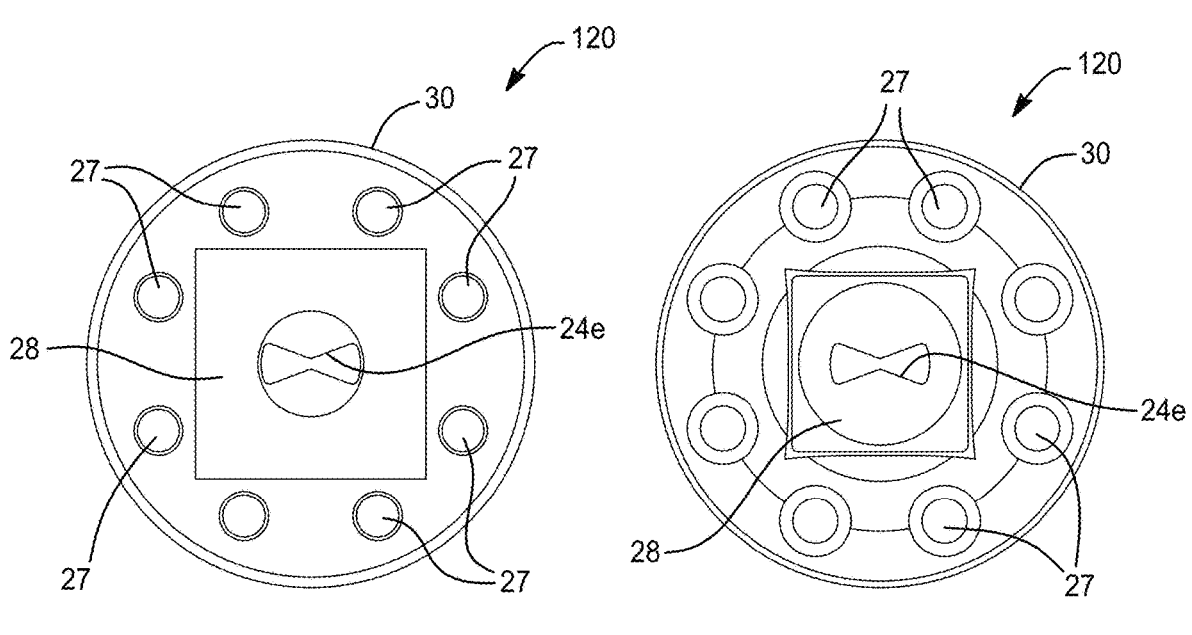
FIG. 13A                    FIG. 13B
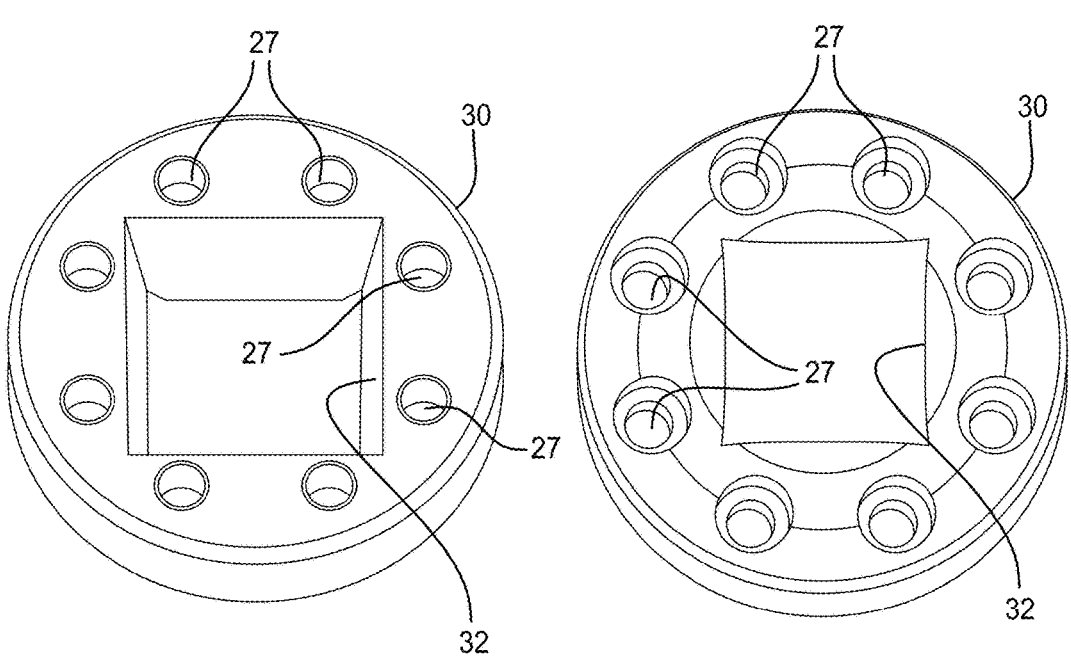
FIG. 14A                    FIG. 14B

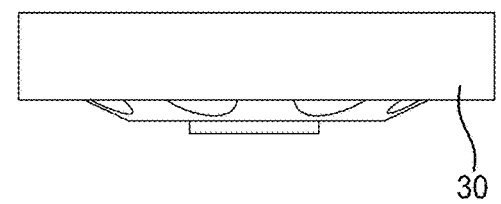
FIG. 16A                              FIG. 16B
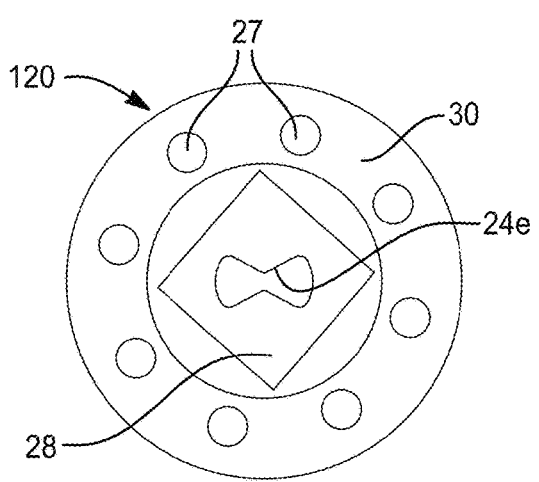
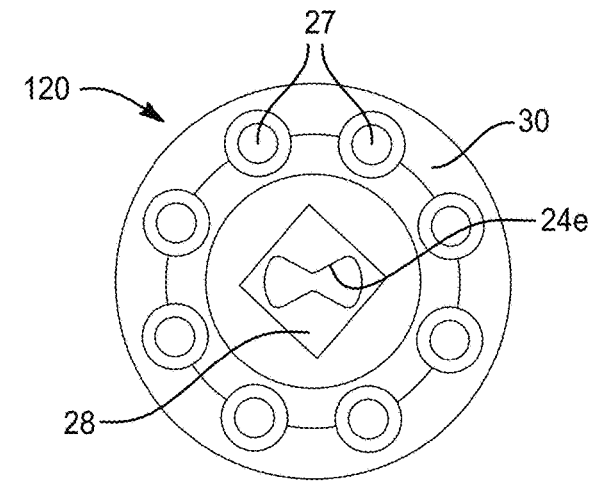
FIG. 17A                              FIG. 17B
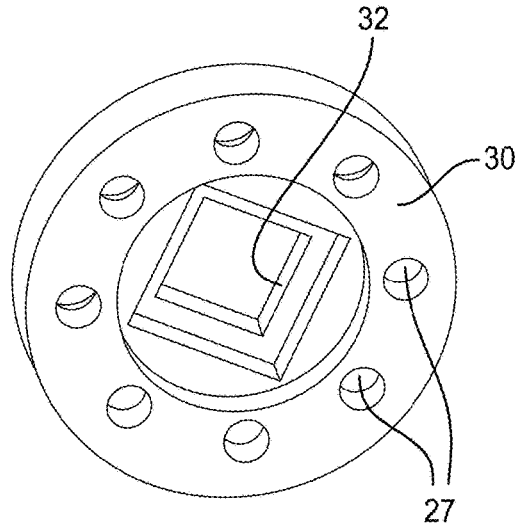
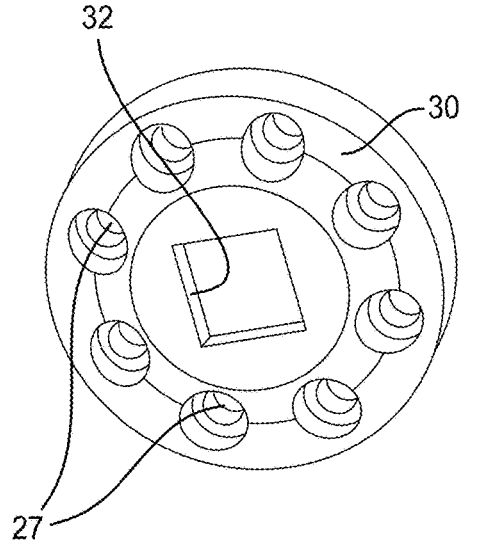
FIG. 18A                              FIG. 18B

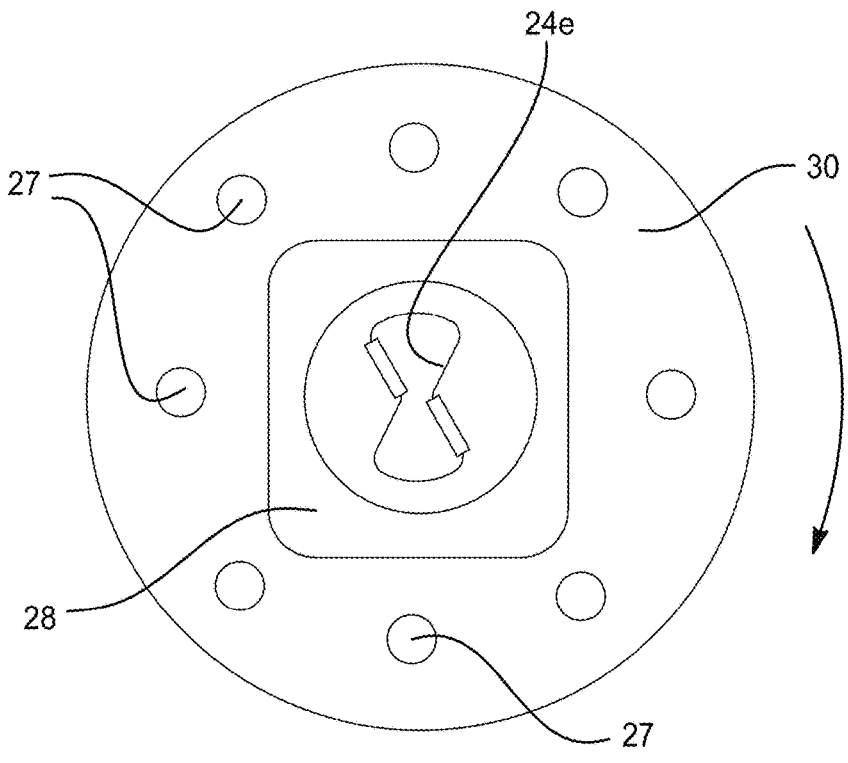
FIG. 23
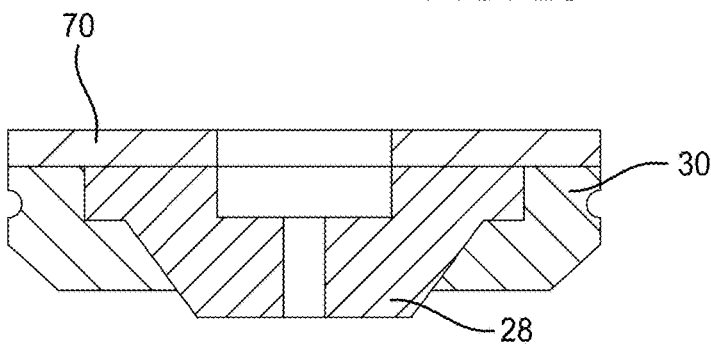
FIG. 24A
FIG. 24B
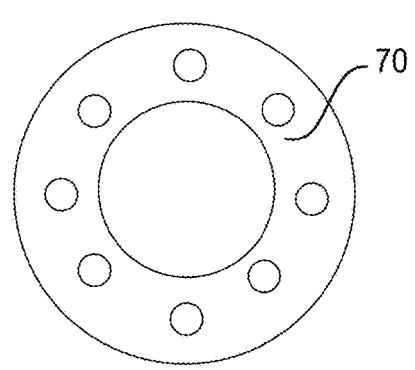
FIG. 24C

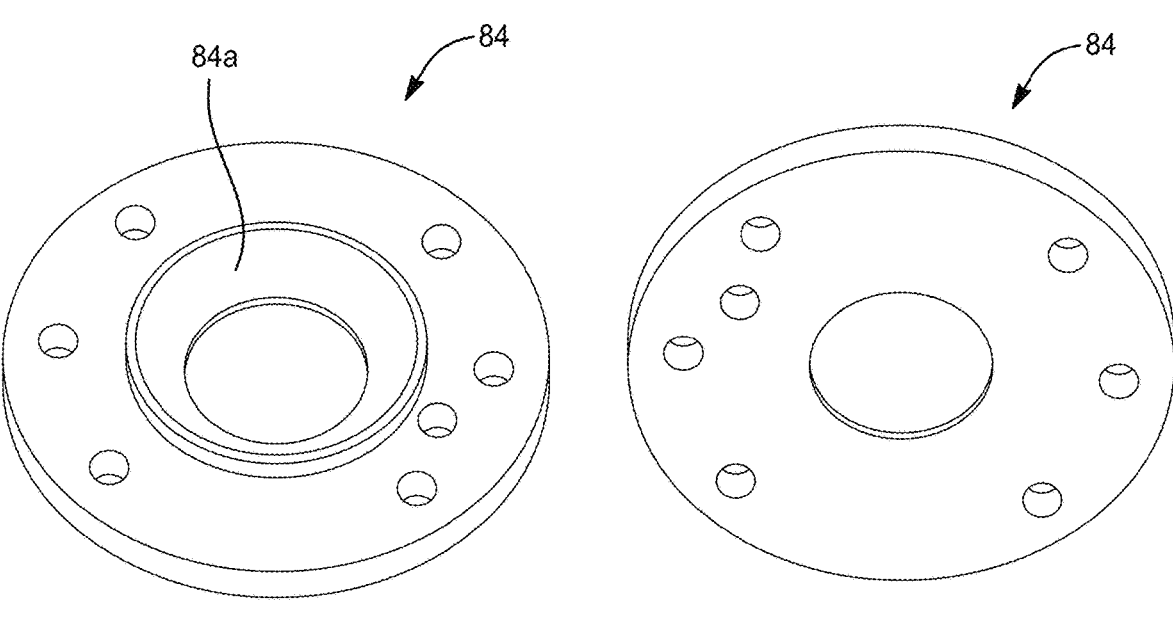
FIG. 27A                    FIG. 27B
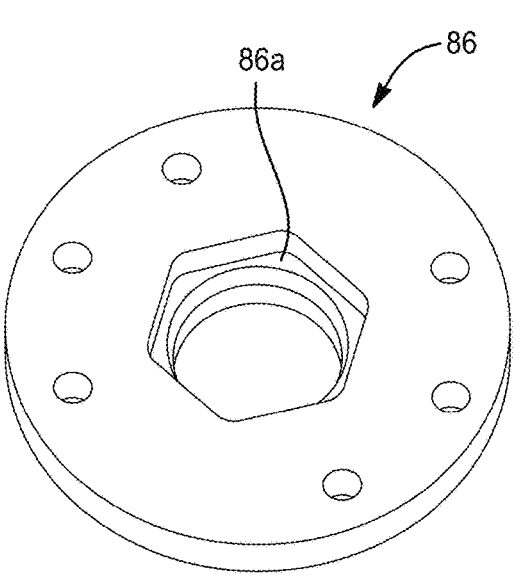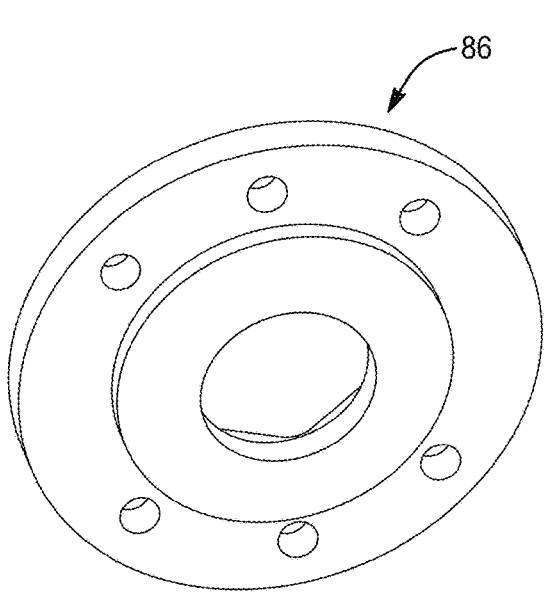
FIG. 28A                    FIG. 28B

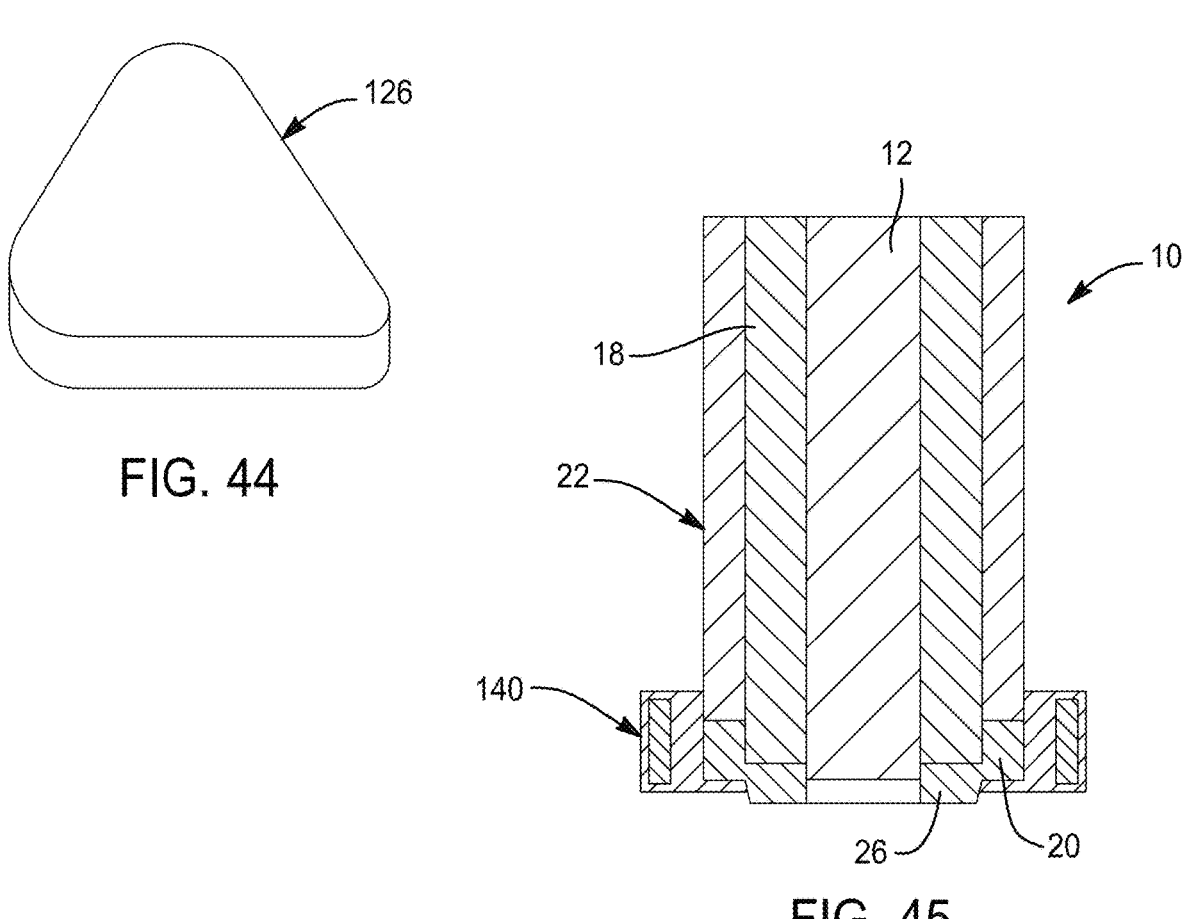
FIG. 44
FIG. 45
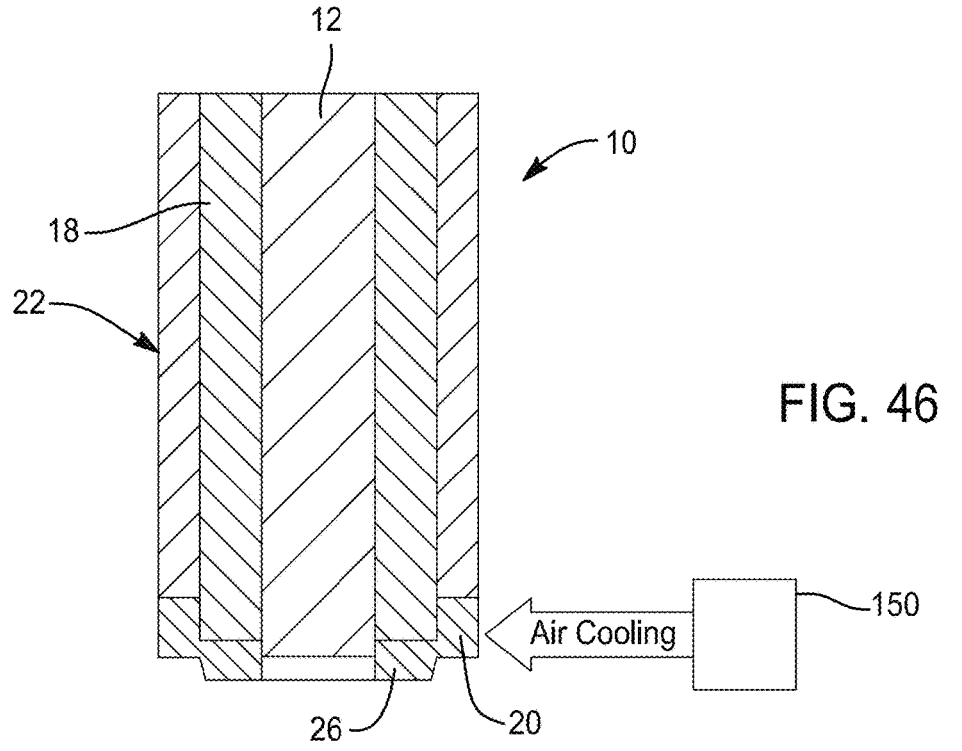
FIG. 46

SOFT TOUCH SOLID-STATE ADDITIVE MANUFACTURING PROCESS AND SYSTEM

CROSS-REFERENCE TO RELATED APPLICATIONS

This application claims the benefit of U.S. Provisional Application No. 63/470,196, filed on Jun. 1, 2023. The entire disclosure of the above application is incorporated herein by reference.

The present disclosure relates to additive manufacturing and, more particularly, relates to additive manufacturing for metallic materials using rotary friction-extrusion based solid-state material processing.

BACKGROUND AND SUMMARY

This section provides background information related to the present disclosure which is not necessarily prior art. This section also provides a general summary of the disclosure, and is not a comprehensive disclosure of its full scope or all of its features.

Generally, the present system and process is a newly developed additive manufacturing method to deposit metallic materials using rotary friction extrusion based solid-state material processing. In some embodiments, the process uses a metallic feedstock rod (being round, square, or any other shape), a pushing mechanism for the feedstock rod, an anti-rotation mechanism for the feedstock rod, a stationary guiding tube, and a rotating extrusion die profile at the end of the feedstock rod. The extrusion die/tooling generates friction and softens the material to extrude and deposit over a substrate material (additively depositing layer-by-layer). The extrusion die/tooling can be a single-part design for non-ferrous (soft metals) and can be a multiple-part design for ferrous (hard metals) deposition using rotary friction extrusion based additive manufacturing and vice-versa.

The present disclosure provides friction extrusion die/tooling design for SoftTouch AM™ solid-state additive manufacturing process for non-ferrous (aluminum, aluminum alloys, copper, copper alloys and such metals/alloys etc.) and ferrous (mild steel, stainless steel, high entropy alloys, nickel-based alloys, high temperature alloys and such metals/alloys). Generally, the tooling design provides an extrusion profile to generate rotary friction and then soften the feedstock material to soften, extrude and deposit over the substrate. Single-part extrusion tool/die designs for non-ferrous materials and multi-part extrusion tool designs for ferrous materials are composed with experimental proofs of the functionalities.

Therefore, according to the principles of the present teachings, a soft touch additive manufacturing system and method (SoftTouch AM™) is disclosed that permits deposition of metallic materials using rotary friction extrusion based solid-state material processing. In some embodiments, the additive manufacturing system for additive manufacturing a feedstock material upon a substrate comprises a feedstock supplying system configured to supply the feedstock material; and an extrusion die system having a rotating drive system configured to rotate an extrusion die member relative to and in physical contact with the feedstock material to generate rotary friction sufficient to locally heat the feedstock material.

According to an aspect of the present disclosure, an additive manufacturing system for additive manufacturing a feedstock material upon a substrate, the additive manufacturing system includes a feedstock supplying system configured to supply the feedstock material. A rotating extrusion die system includes a drive system configured to rotate an extrusion die member relative to and in physical contact with the feedstock material to generate friction sufficient to locally heat and soften the feedstock material, the rotating extrusion die member having an extrusion orifice through which the heated and softened feedstock material is extruded.

According to a further aspect, the extrusion die member does not contact the feedstock material at any tangential or circumferential surface of the feedstock material and the feedstock does not rotate in any case.

According to a further aspect, the extrusion die member is spaced apart from the substrate.

According to a further aspect, the extrusion die system having the rotating drive system is configured to rotate the extrusion die member relative to and in physical contact with the feedstock material to generate friction sufficient to locally heat the feedstock material to plasticize the feedstock material to provide malleable feedstock material to extrude and deposit through the extrusion orifice of the extrusion die member.

According to a further aspect, the extrusion die member comprises an outer surface adjacent to the orifice, the outer surface configured to engage the extruded and deposited malleable feedstock material.

According to a further aspect, the extrusion die member includes an off-center orifice.

According to a further aspect, the extrusion die member includes a rectangular slot-shaped orifice.

According to a further aspect, the extrusion die member includes a bow-tie shaped orifice.

According to a further aspect, the extrusion die member includes a dog-bone shaped orifice.

According to a further aspect, the extrusion die member includes a Y-shaped orifice.

According to a further aspect, the feedstock has a square footprint.

According to a further aspect, the feedstock has a circular footprint.

According to a further aspect, the extrusion orifice includes plural orifices.

According to a further aspect, the plural orifices are D-shaped.

According to a further aspect, the plural orifices are triangular shaped.

According to a further aspect, the extrusion die member includes a die retainer having an opening therein and an insert received in the opening, the extrusion orifice extending through the insert.

According to a further aspect, the die member includes a plurality of mounting apertures therein.

According to a further aspect, the extrusion die member is connected to the drive system by an insulating washer.

According to a further aspect, the feedstock supplying system includes a channel with an end nut removably mounted to a distal end of the channel and having an aperture through which the feedstock is delivered.

According to a further aspect, a retainer washer opposes the end nut.

According to a further aspect, a flash cutting feature is mounted to the rotary extrusion die system.

According to a further aspect, the flash cutting feature includes a radial passage.

According to a further aspect, the rotary extrusion die system includes one of a liquid or air cooled system

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

FIGS. 3A-3C illustrate various rotary extrusion dies according to the principles of the present teachings.

FIG. 4A illustrates an example rotary extrusion die and FIG. 4B shows a corresponding rotary friction extrusion deposition placed on a substrate according to the principles of the present disclosure.

FIGS. 12A-22D illustrate various multi-part rotary extrusion die configurations.

FIG. 23 illustrates a leading edge profile of a rotary extrusion die according to the principles of the present disclosure.

FIGS. 24A-24C illustrate a ceramic insulative washer configuration according to the principles of the present disclosure.

FIGS. 27A-27B are top and bottom perspective views, respectively, of a retainer of the rotary extrusion die shown in FIG. 25.

FIGS. 28A-28B are top and bottom perspective views, respectively, of a holder of the rotary extrusion die shown in FIG. 25.

4

Figure 37:
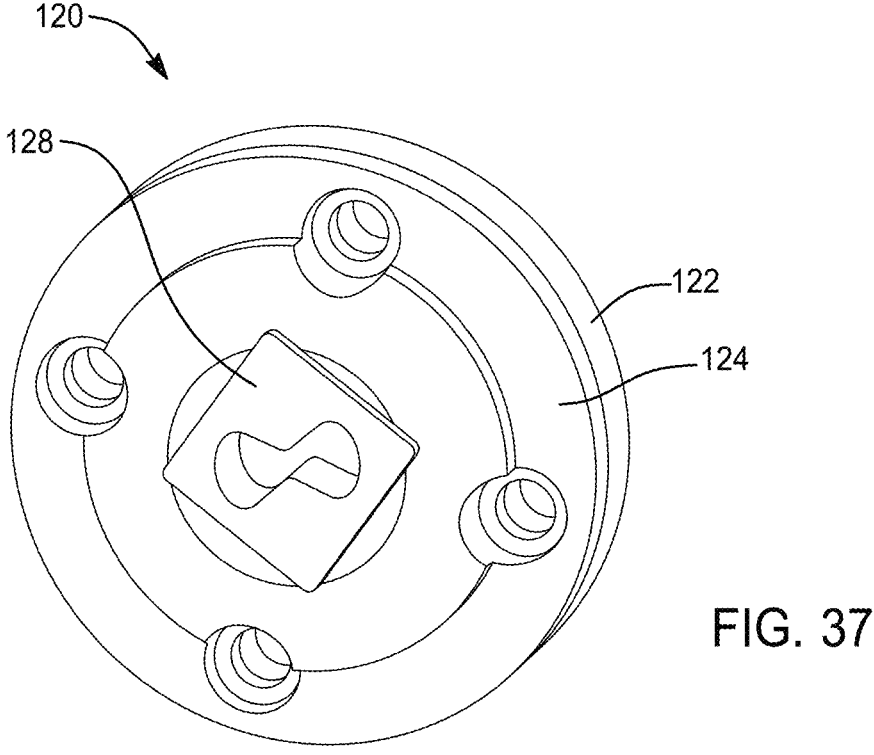

FIG. 37 is a bottom perspective view of a die tooling set with flash cutting features according to a second embodiment.

Figure 38:
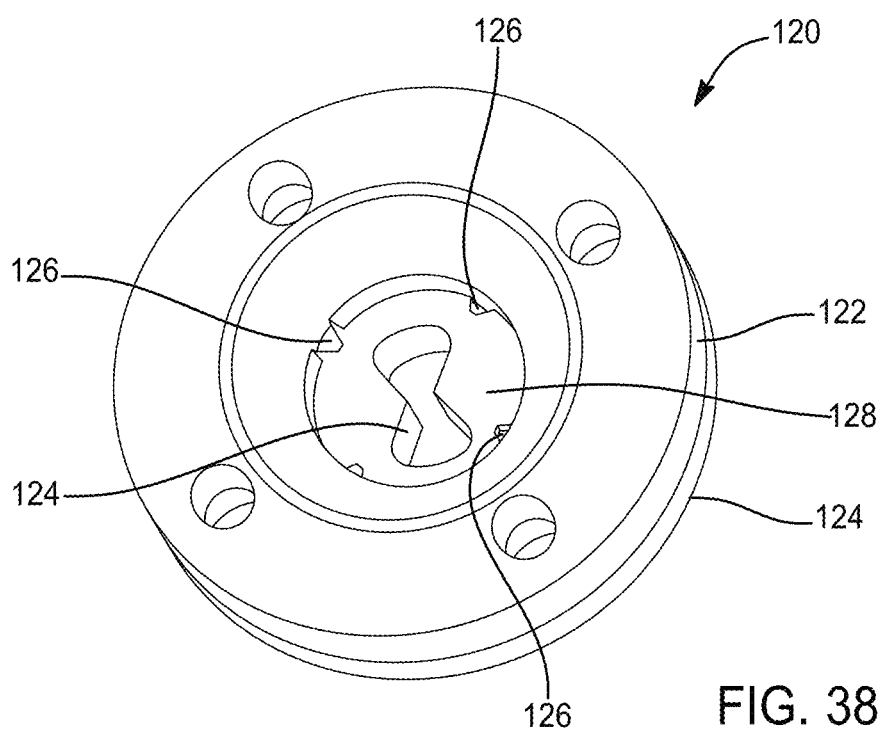

FIG. 38 is a top perspective view of the die tooling set shown in FIG. 37.

Figure 39:
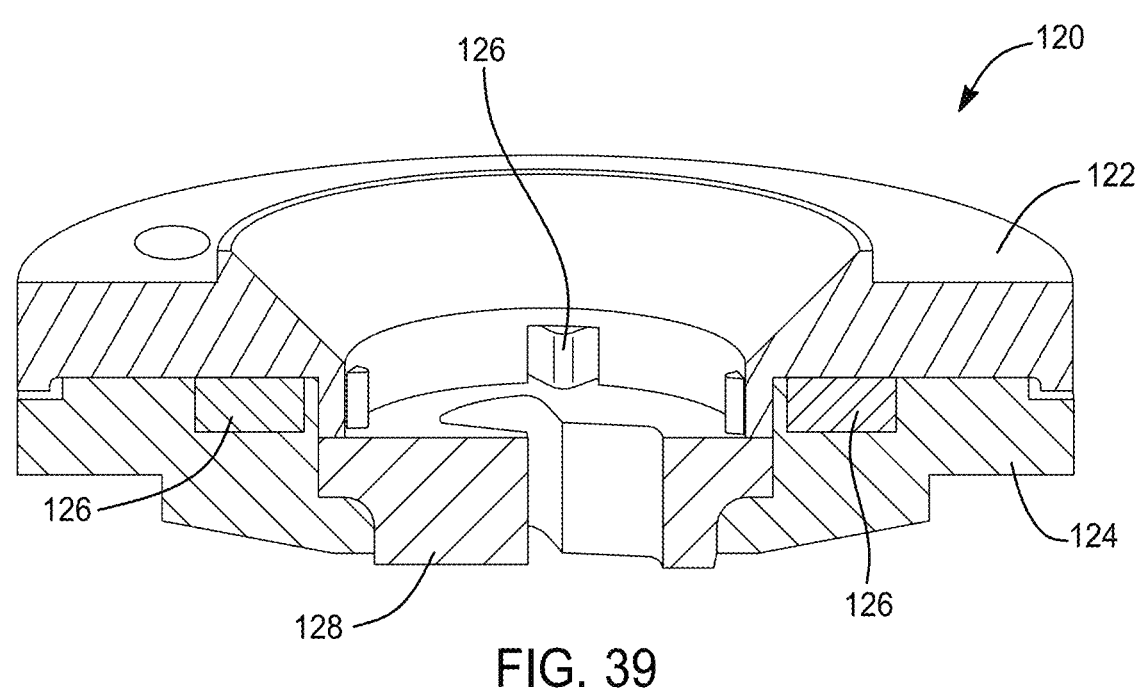

FIG. 39 is a cross-sectional view of the die tooling set shown in FIG. 37.

Figure 40:
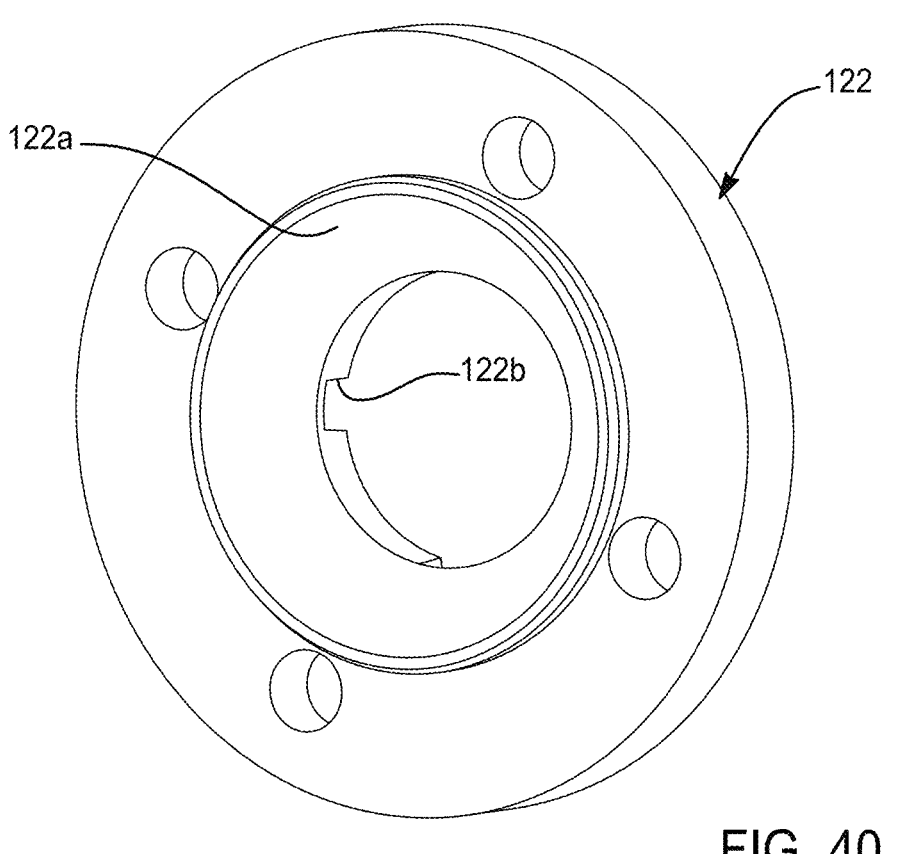

FIG. 40 is a top perspective view of a retainer of the rotary extrusion die shown in FIG. 37.

Figure 41:
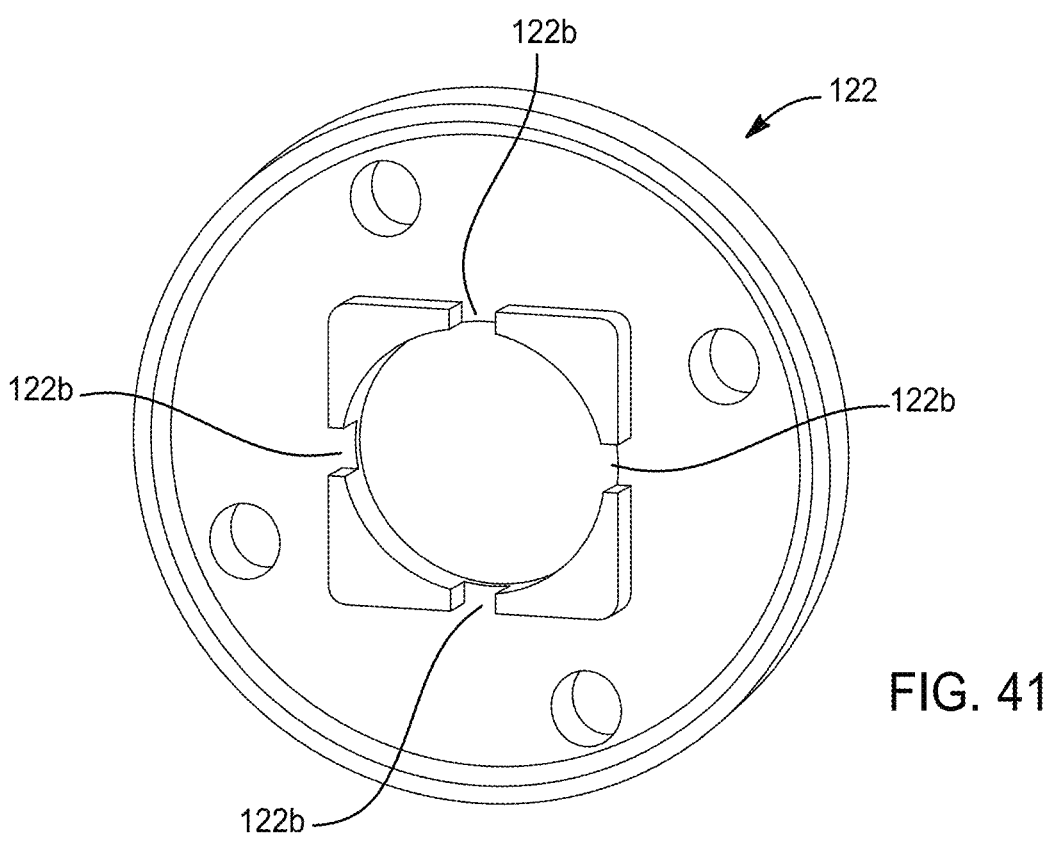

FIG. 41 is a bottom perspective view of the retainer of the rotary extrusion die shown in FIG. 37.

Figure 42A:
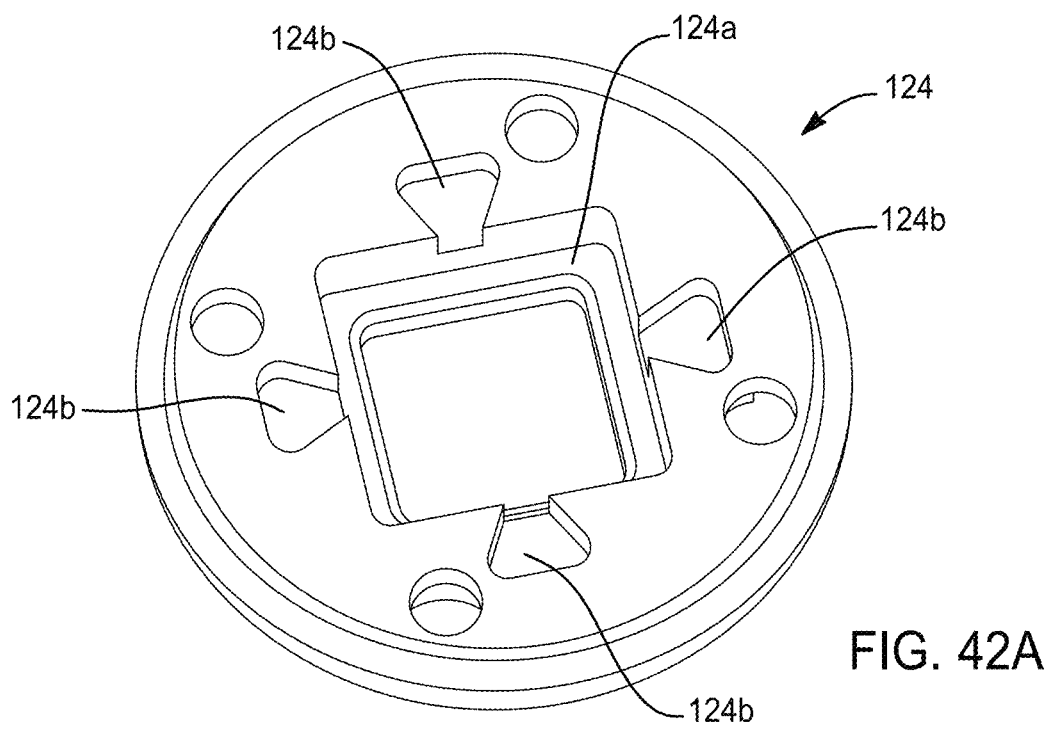

FIG. 42A is a top perspective view of a die holder of the rotary extrusion die shown in FIG. 37.

Figures 42B, 43A, 43B:
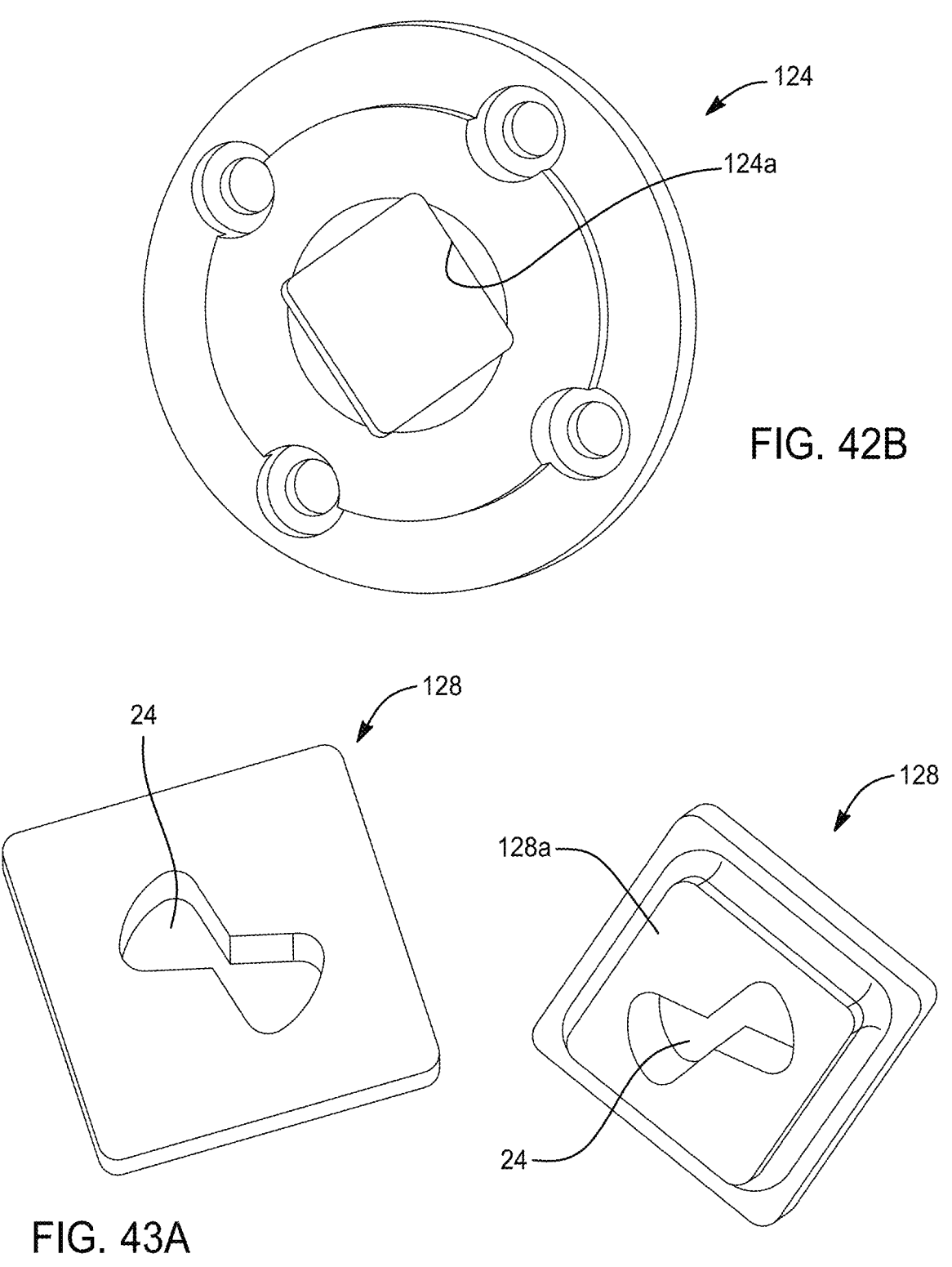

FIG. 42B is a bottom perspective view of the die holder of the rotary extrusion die shown in FIG. 37.

FIG. 43A is a top perspective view of a die insert of the rotary extrusion die shown in FIG. 37.

FIG. 43B is a bottom perspective view of the die insert of the rotary extrusion die shown in FIG. 37.

FIG. 44 is a perspective view of a flash cutting tooth feature according to the principles of the present disclosure.

FIG. 45 is a schematic view of an additive manufacturing system according to the principles of the present disclosure with a cooling accessory on the rotary extrusion die.

FIG. 46 is a schematic view of an additive manufacturing system according to the principles of the present disclosure with a blower providing cooling air (or liquid carbon dioxide or any other cooling or phase changing liquid, powder, or gaseous media) on the rotary extrusion die.

Figure 47:
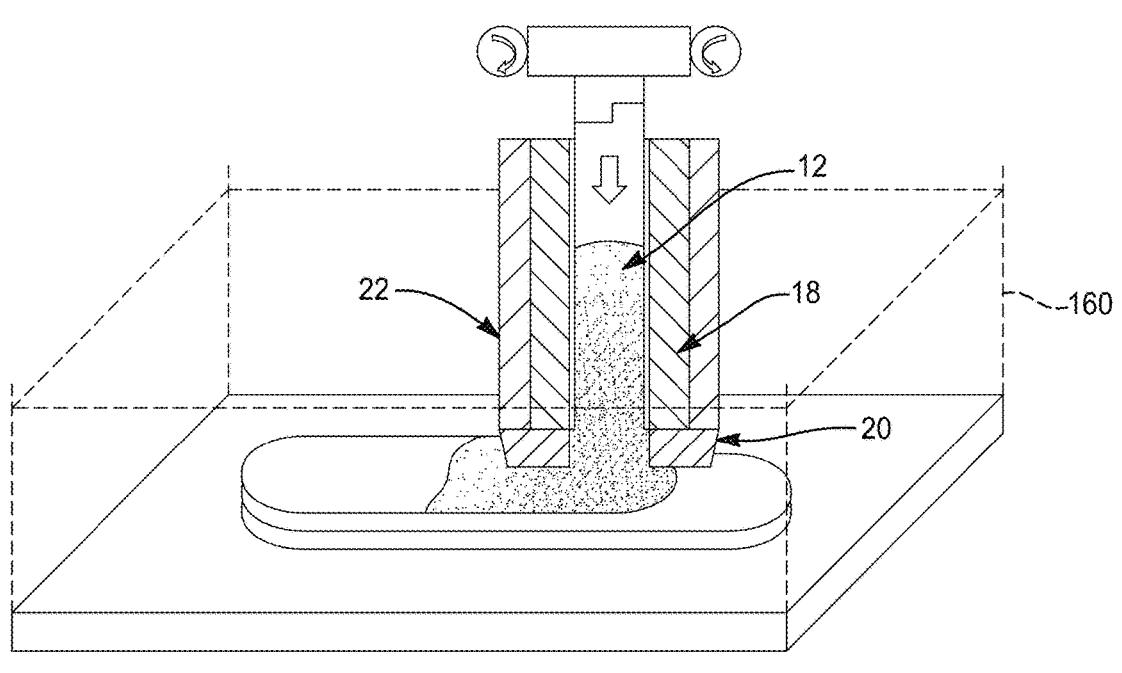

FIG. 47 is a schematic view of an additive manufacturing system according to the principles of the present disclosure with the rotary extrusion die applying additive material to a substrate within a cooling bath.

Figure 48:
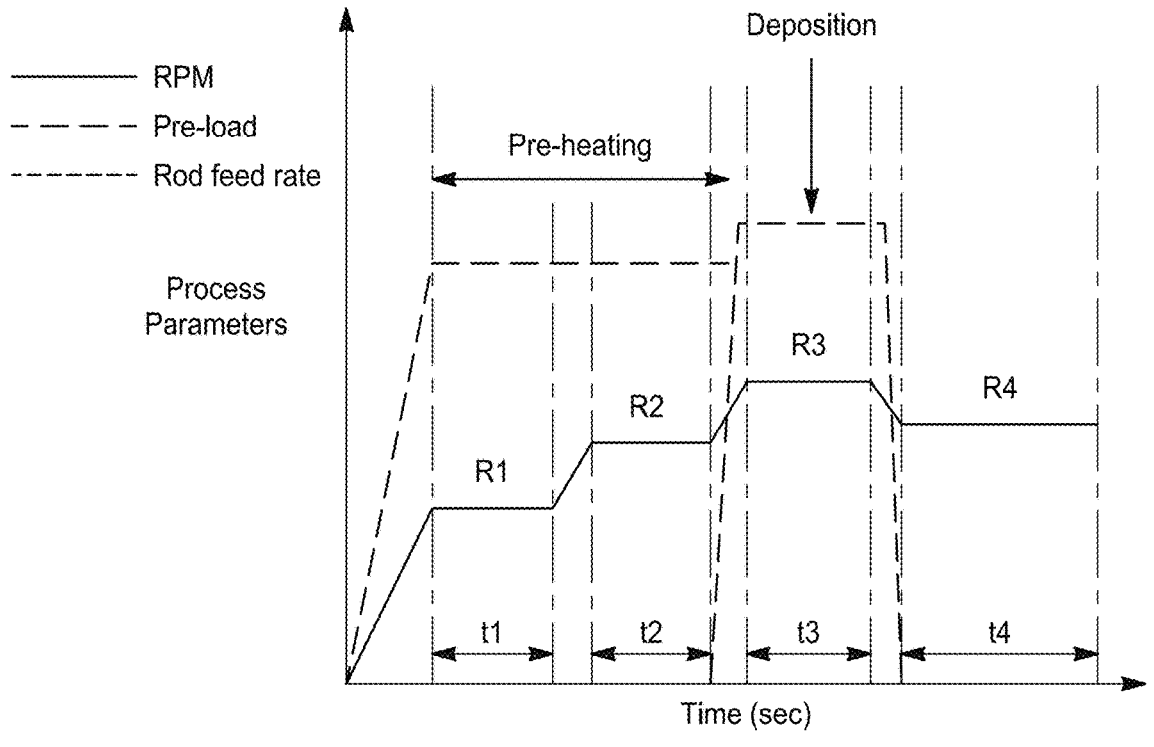

FIG. 48 is an exemplary graph of process parameters during an additive manufacturing process according to the principles of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

According to the principles of the present teachings, an additive manufacturing system for additive manufacturing a feedstock material upon a substrate or previous layer is provided having advantageous construction and method of use. In some embodiments, the additive manufacturing system comprises a feedstock supplying system configured to supply the feedstock material and an extrusion die system having a rotating drive system configured to rotate an extrusion die member relative to and in physical contact with the feedstock material to generate friction sufficient to locally heat and soften the feedstock material. The feedstock does not rotate in any case. The extrusion die member does not contact the feedstock material at any tangential or circumferential surface of the feedstock material. The extrusion die member is spaced apart from the substrate at all times. In some embodiments, the extrusion die system having the rotating drive system is configured to rotate the extrusion die member relative to and in physical contact with the feedstock material to generate friction sufficient to locally heat the feedstock material to plasticize the feedstock material to provide malleable feedstock material to extrude and deposit through an orifice of the extrusion die member. In some embodiments, the extrusion die member comprises an outer surface adjacent to the orifice, the outer surface is configured to engage or plaster (spread) the extruded and deposited malleable feedstock material.

Figure 1:
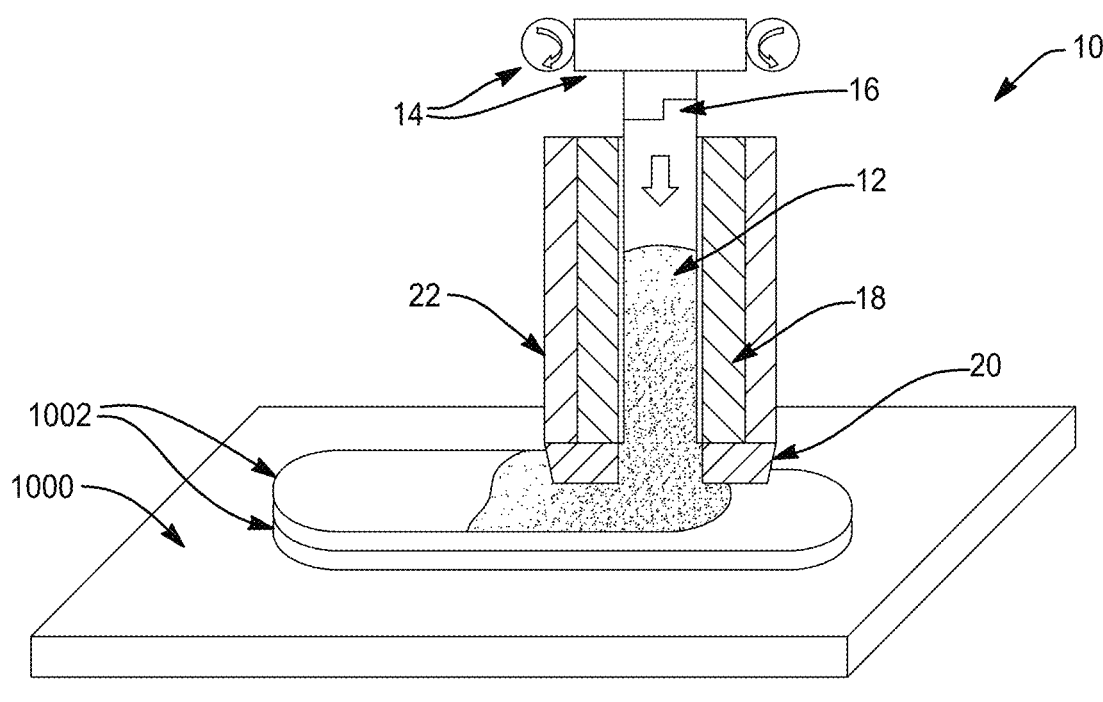
FIG. 1 is a schematic view of an additive manufacturing system according to the principles of the present disclosure.
Figure 2:
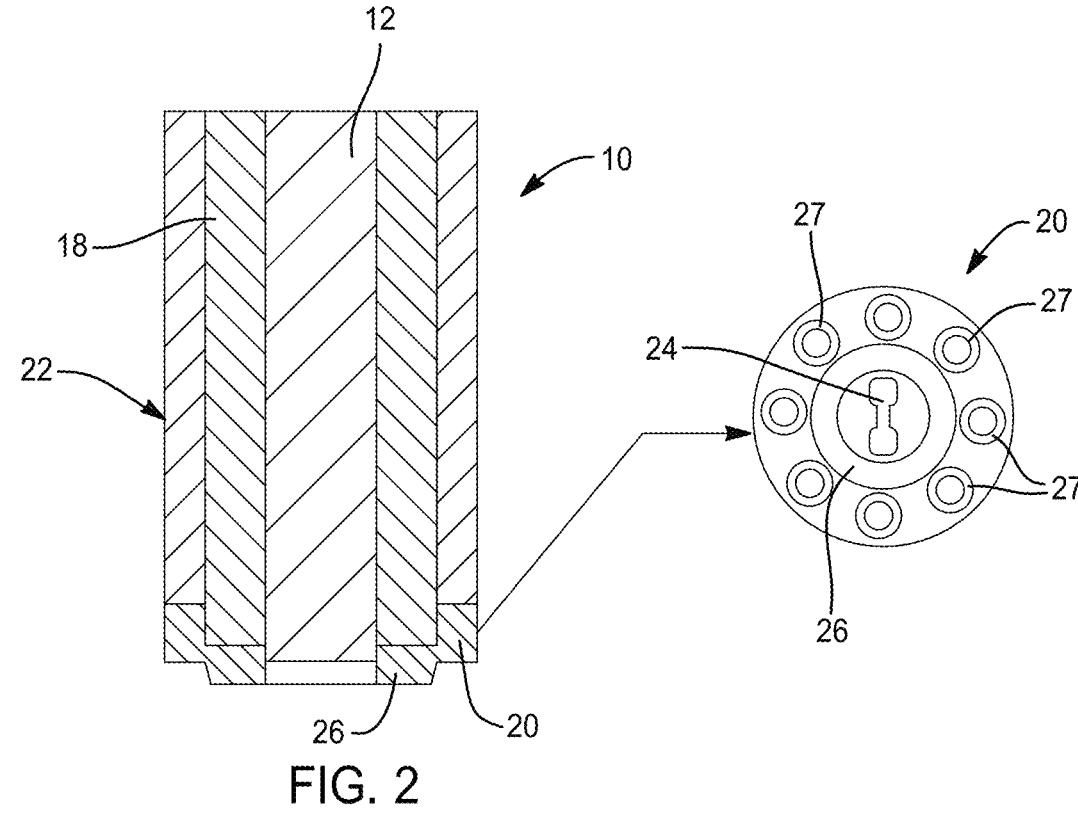
FIG. 2 illustrates a schematic view of the additive manufacturing system according to the principles of the present disclosure, with portions removed for clarity.

With particular reference to FIGS. 1 and 2, an additive manufacturing system 10 is provided having advantageous construction and method of use. Additive manufacturing system 10, which is also referred to as SoftTouch AM™, is an additive manufacturing method design, configured, and operable to deposit metallic materials using rotary friction-based solid-state material processing upon a substrate 1000 or previously deposited layer(s) 1002. In some embodiments, the additive manufacturing system 10 employs a metallic feedstock material in the form of a rod 12, a feedstock supplying system 14 (e.g., pushing mechanism) is configured to supply the feedstock material 12, an anti-rotation mechanism 16 engages the feedstock material 12 to prevent the feedstock material 12 from rotating, a stationary guiding tube 18 receives and guides the feedstock material 12, and a rotating extrusion die 20 is provided at the end of the feedstock material 12. The rotating extrusion die 20 is rotated at very high speed by a rotational sleeve and drive mechanism 22 and generates localized frictional heating on at least a distal portion of the feedstock material 12 and softens the feedstock material 12 to extrude and deposit malleable material over a substrate 1000 (additively depositing layer-by-layer). In some embodiments, the rotating extrusion die 20 can be a single-part (i.e., unitary) design for non-ferrous (i.e., soft metals) or can be a multiple-part design for ferrous (i.e., hard metals, hard alloys, or hard materials (such as nickel alloys, high entropy alloys etc.)) deposition. It should be understood that the tooling 20 does not have direct contact with substrate 1000 in any case.

It should be understood that the present disclosure provides an extrusion die/tooling design for solid-state additive manufacturing for non-ferrous (e.g., aluminum, aluminum alloys, copper, copper alloys and such metals/alloys etc.) and ferrous (e.g., mild steel, stainless steel, and such metals/alloys) materials. Generally, the tooling design provides an extrusion profile to generate friction and then locally heat the feedstock material to soften and then deposit the softened feedstock material 1002 over the substrate 1000. As with known 3-D printing techniques, multiple deposited layers 1002 of softened feedstock material can be built upon one another to form various desired shapes.

In some embodiments, feedstock supplying system 14 comprises a piston or advancing system configured to advance, drive, or otherwise urge feedstock material 12 from a first location or supply source toward the rotating extrusion die 20. It should be understood that feedstock supplying system 14 does not rotate or otherwise impart a rotational motion of feedstock material 12.

In some embodiments, the end of the stationary guiding tube 18 is configured to further ensure that feedstock material 12 does not rotate and remains positionally stable (i.e., does not wobble or impart any lateral dispositioning movement) at a contact surface between feedstock material 12 and an interface face of rotary extrusion die 20 to achieve an efficient malleable state and extrusion. To this end, stationary guiding tube 18 can be disposed coaxially with feedstock material 12. That is, in some embodiments, stationary guiding tube 18 comprises a tubular member having an internal volume or channel sized to receive feedstock material 12. In some embodiments, a spindle member 22 can be disposed outside of stationary guiding tube 18 to further support stationary guiding tube 18 and/or rotary extrusion die 20. In some embodiments, spindle member 22 is driven in a rotating direction about a central axis.

In some embodiments, rotary extrusion die 20 is disposed upon a distal end of spindle member 22. The spindle member 22 can be part of any known type of rotary drive system including but not limited to an electric, hydraulic, and pneumatic motor and can include a gear mechanism for increasing the drive ratio of the spindle member 22. In some embodiments, the rotary extrusion die 20 is selectively coupled with spindle member 22 for rotation therewith. Upon rotation of the spindle member 22 and the rotary extrusion die 20, the rotary extrusion die 20 generates friction and softens the feedstock material 12 to extrude this softened malleable material to deposit upon substrate 1000 and/or deposited layers 1002. In some embodiments, the rotary extrusion die 20 comprises an extrusion opening or die orifice 24 extending through a die face 26. In some embodiments, die orifice 24 is configured to have a shape and size conducive and configured to generate friction, heat, and soften the feedstock material 12 and then extrude and deposit the malleable feedstock material. The rotary extrusion die 20 can include a plurality of mounting apertures 27 that are used to mount the rotary extrusion die 20 to the spindle member with a plurality of fasteners (not shown). In FIG. 2, the die orifice 24 is shown to be dog bone shaped.

In some embodiments, an internal surface of die face 26 of rotary extrusion die 20 contacts the distal end of the feedstock material 12. Accordingly, in some embodiments, die face 26 is made of steel material or ceramic material or high temperature refractory material to withstand the high temperature generated via friction. In some embodiments, die face 26 is made of a steel material or ceramic material or high temperature refractory material capable of withstanding high temperature (higher than at least 600° C. and retaining strength, for example, low or high carbon steels, tool steel, high temperature steel, nickel alloys, silicon carbide (SiC), polycrystalline cubic boron nitride (PCBN), silicon carbide diamond or versimax (SiC/D), tungsten rhenium, (any variant W-3% Re, W-5% Re, W-25% Re, W-26% Re) (W—Re), tungsten rhenium hafnium carbide (WReHfC), tungsten carbide (WC or W2C), lanthanated tungsten (W—La or W—La2O3), pure tungsten (W), polycrystalline diamond (PCD) etc. In a single-part design configuration, the entire extrusion die 20 can be made of steel material or ceramic or high-temperature refractory material as noted herein. In a multi-part design configuration, extrusion die 20 can comprise a first section being made of the ceramic or high temperature refractory material (alumina, zirconia, silicon carbide (SiC), polycrystalline cubic boron nitride (PCBN), silicon carbide diamond or versimax (SiC/D), tungsten rhenium, (any variant W-3% Re, W-5% Re, W-25% Re, W-26% Re) (W—Re), tungsten carbide (WC or W2C), lanthanated tungsten (W—La or W—La2O3), pure tungsten (W), polycrystalline diamond (PCD) etc.) and a second section surrounding the first section can be made of any hard metal (ferrous or any other hard metals, low or high carbon steel, hardened steel, tool steel, high temperature steel, titanium alloys, Ni-based alloys, tungsten or tungsten based alloys, such as tungsten rhenium, (any variant W-3% Re, W-5% Re, W-25% Re, W-26% Re) (W—Re), tungsten carbide (WC or W2C), lanthanated tungsten (W—La or W—La2O3) or any other) to provide a locking mechanism as well as keeping the assembly attached to the spindle 22.

In some embodiments as illustrated in FIGS. 3A-23B, die orifice 24 of rotary extrusion die 20 can be of any shape conducive to provide a desired friction and/or extrusion profile. In some embodiments, die orifice 24 is configured in response to the type of material of feedstock material 12. As shown in FIG. 3A, the rotary extrusion die 20a is shown with a round off-centered orifice 24a. As shown in FIG. 3B, the rotary extrusion die 20b is shown with an off-centered elongated slot orifice 24b. As shown in FIG. 3C, the rotary extrusion die 20c is shown with a centered elongated slot orifice 24c.

As shown in FIG. 4A, the rotary extrusion die 20e is shown with a bowtie shaped orifice 24e. FIG. 4B illustrates a corresponding friction extrusion deposition 1002 placed on a substrate 1000 according to the principles of the present disclosure.

Figure 5A:
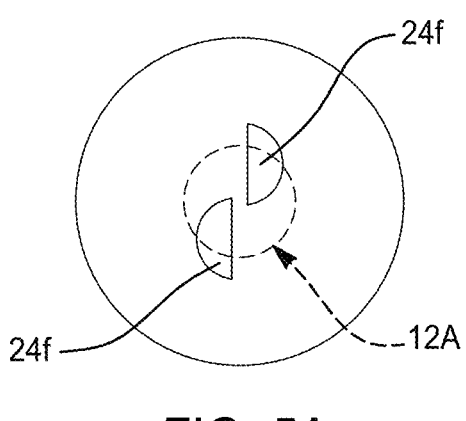
FIGS. 5A-10B illustrate various die orifice of various rotary extrusion dies and corresponding feedstock material footprints.
Figure 5B:
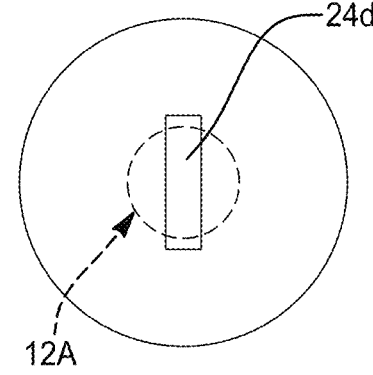
Figure 6A:
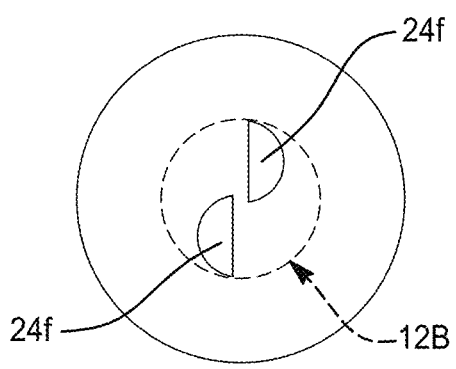
Figure 6B:
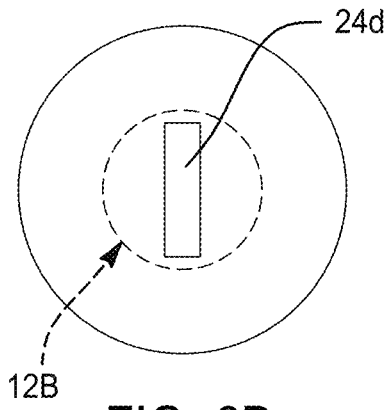
Figure 7A:
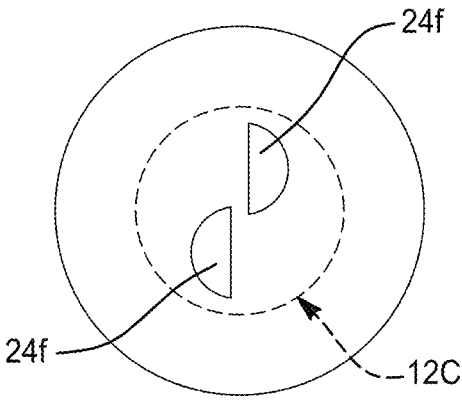
Figure 7B:
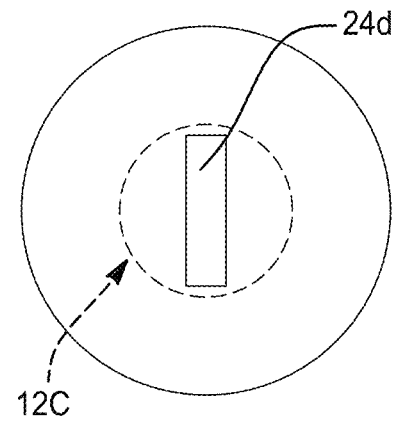
Figure 8A:
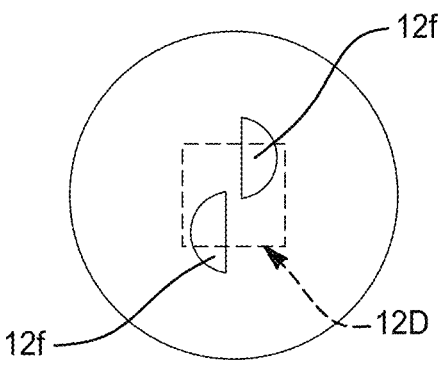
Figure 8B:
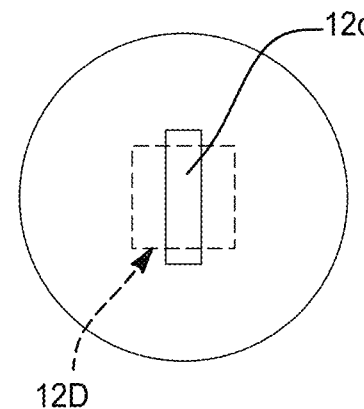
Figure 9A:
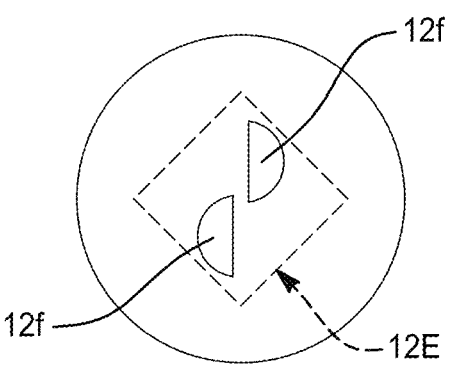
Figure 9B:
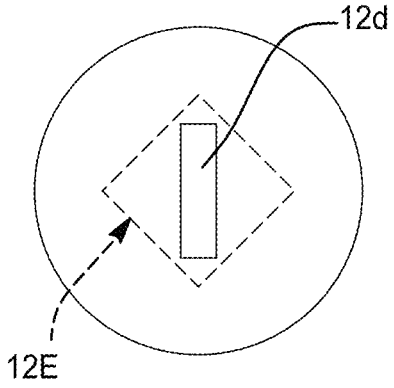
Figure 10A:
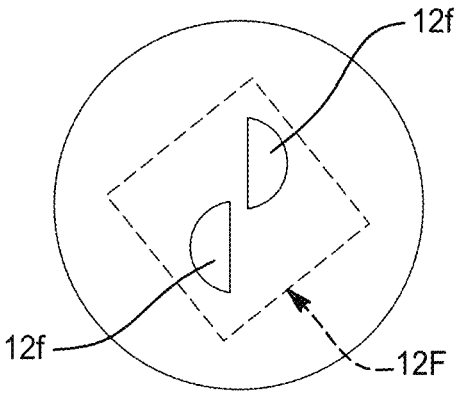
Figure 10B:
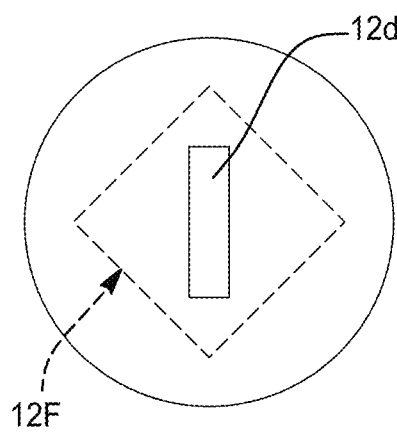

In some embodiments, feedstock material 12 can comprise a cross-sectional shape conducive for supplying, anti-rotation, and/or the like. In some embodiments, feedstock material 12 can be rod-shaped having a round, square, or other cross-sectional shape. With reference to FIGS. 5A and 5B, the feedstock material footprint 12A is shown including a circular profile that is smaller than a width of the corresponding extrusion orifice 24f. In FIGS. 5A-10A, the extrusion orifice 24f as shown includes two D-shaped orifices 24f. Each D-shaped orifice 24f can be off-center. In FIGS. 5B-10B, the extrusion orifice is a centered elongated slot 24d. With reference to FIGS. 6A and 6B, the feedstock material footprint 12B is shown including a circular profile that is approximately equal to a width of the corresponding extrusion orifices 24f, 24d. With reference to FIGS. 7A and 7B, the feedstock material footprint 12C is shown including a circular profile that is larger than a width of the corresponding extrusion orifices 24f, 24d. With reference to FIGS. 8A and 8B, the feedstock material footprint 12D is shown including a square profile that is smaller than a width of the corresponding extrusion orifices 24f, 24d. With reference to FIGS. 9A and 9B, the feedstock material footprint 12E is shown including a square profile that is approximately equal to a width of the corresponding extrusion orifices 24f, 24d. With reference to FIGS. 10A and 101B, the feedstock material footprint 12F is shown including a square profile that is larger than a width of the corresponding extrusion orifices 24f, 24d.

Figure 11A:
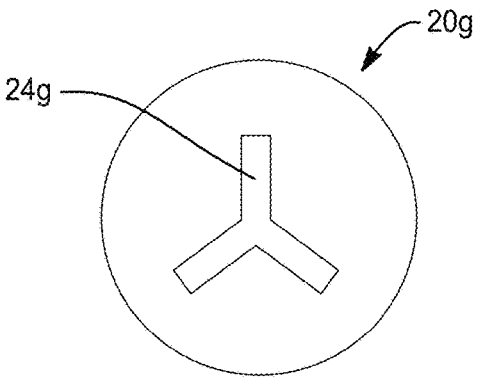
FIGS. 11A-11D illustrate various die orifice of various rotary extrusion dies.
Figure 11B:
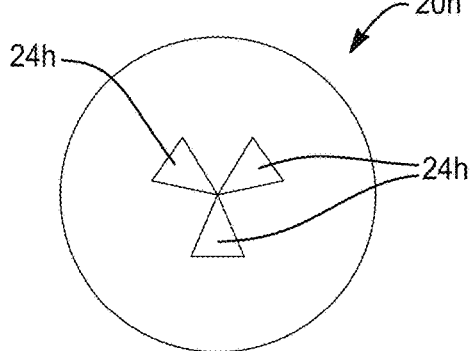
Figure 11C:
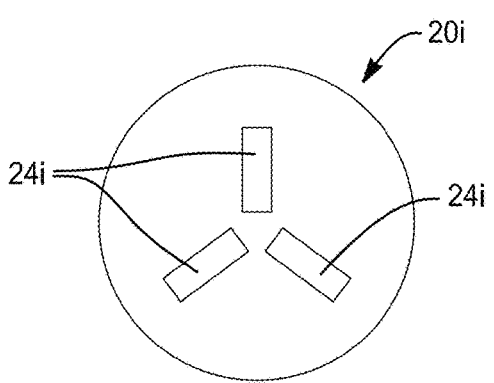
Figure 11D:
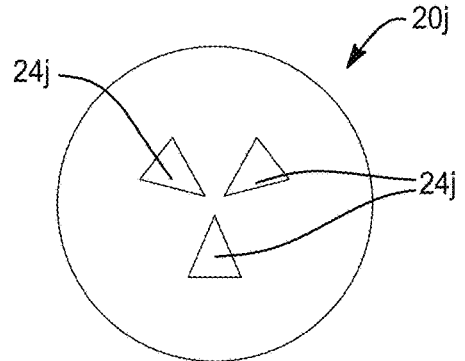
Figure 12A:
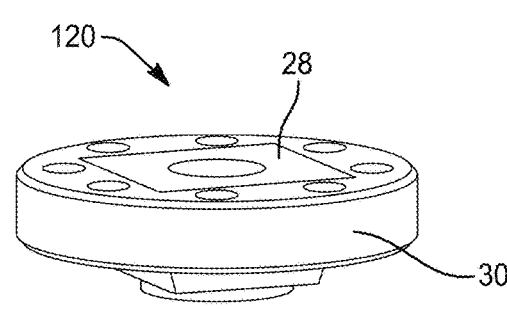
Figure 12B:
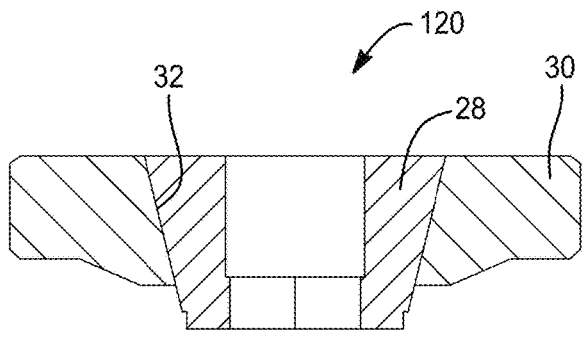
Figure 15A:
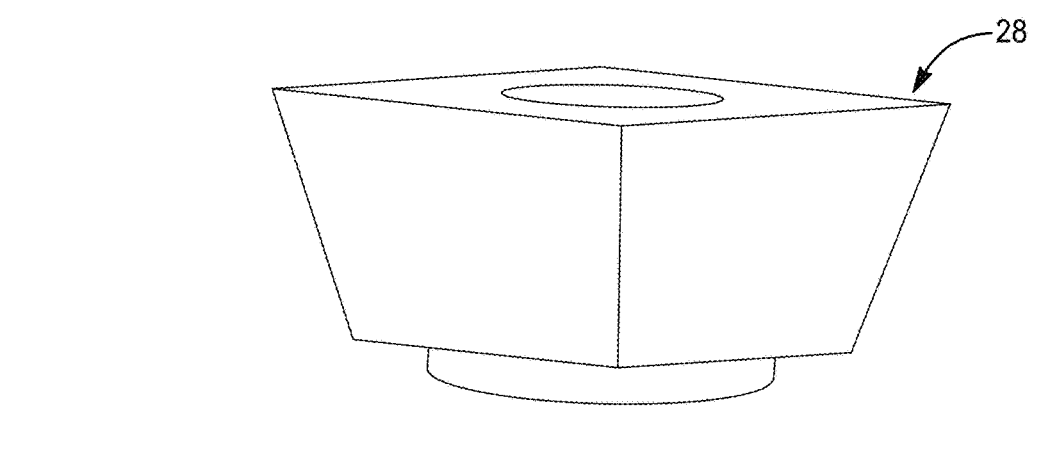
Figure 15B:
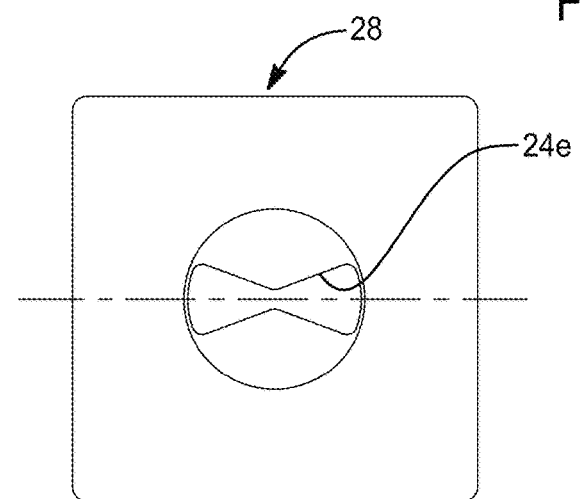
Figure 15C:
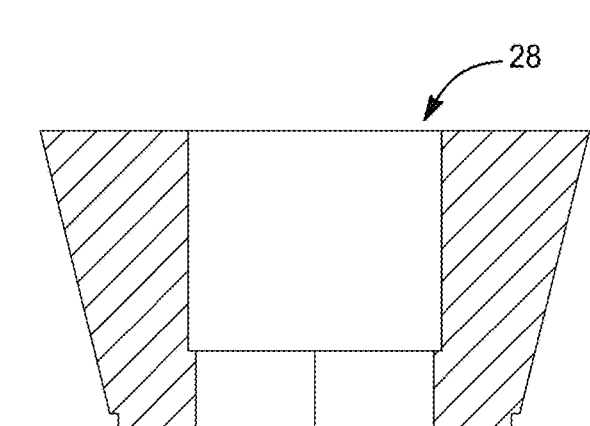
Figure 15D:
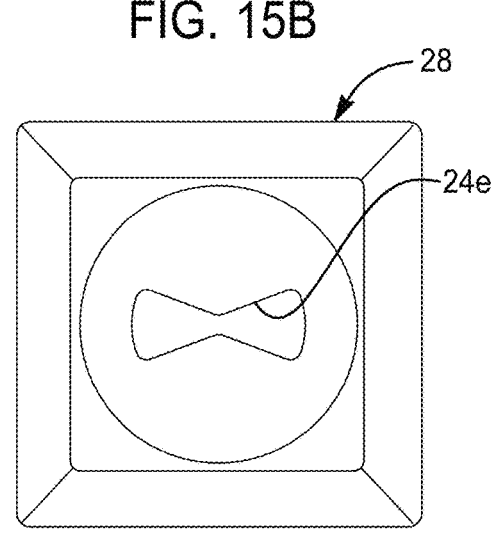
Figure 15E:
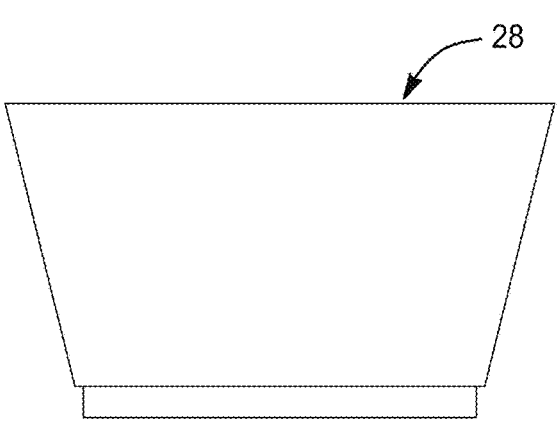
Figure 19A:
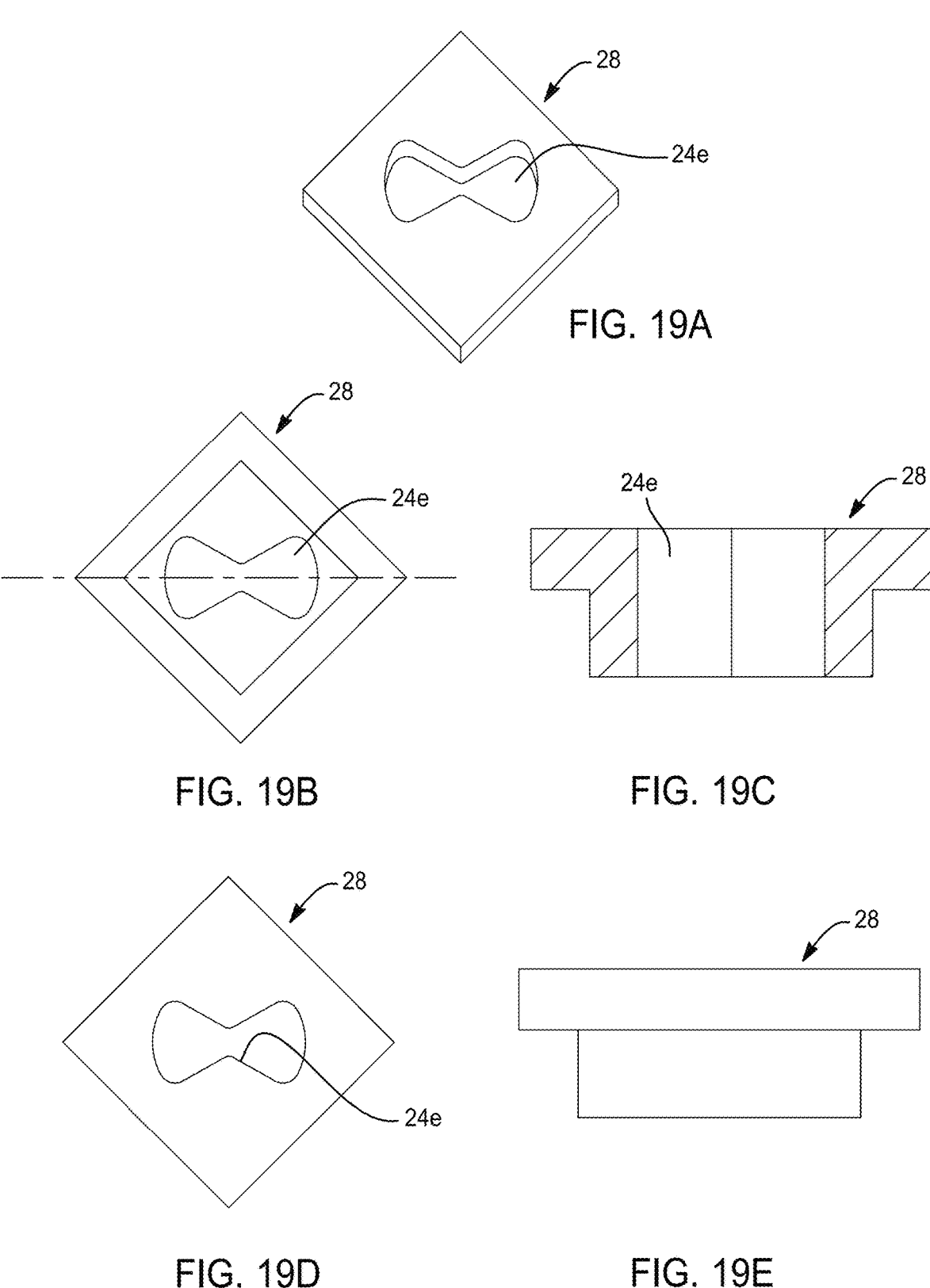
Figures 20A, 20B:
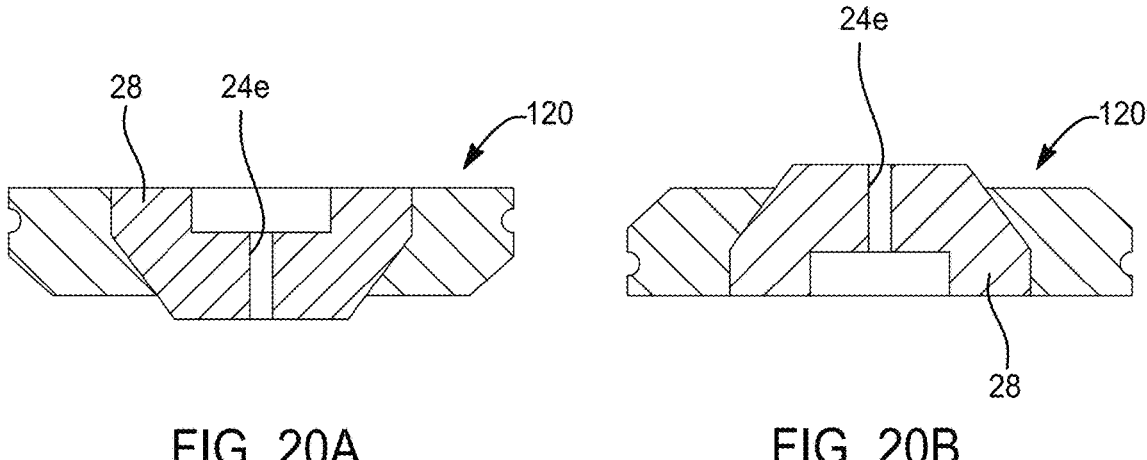
Figures 20C, 20D:
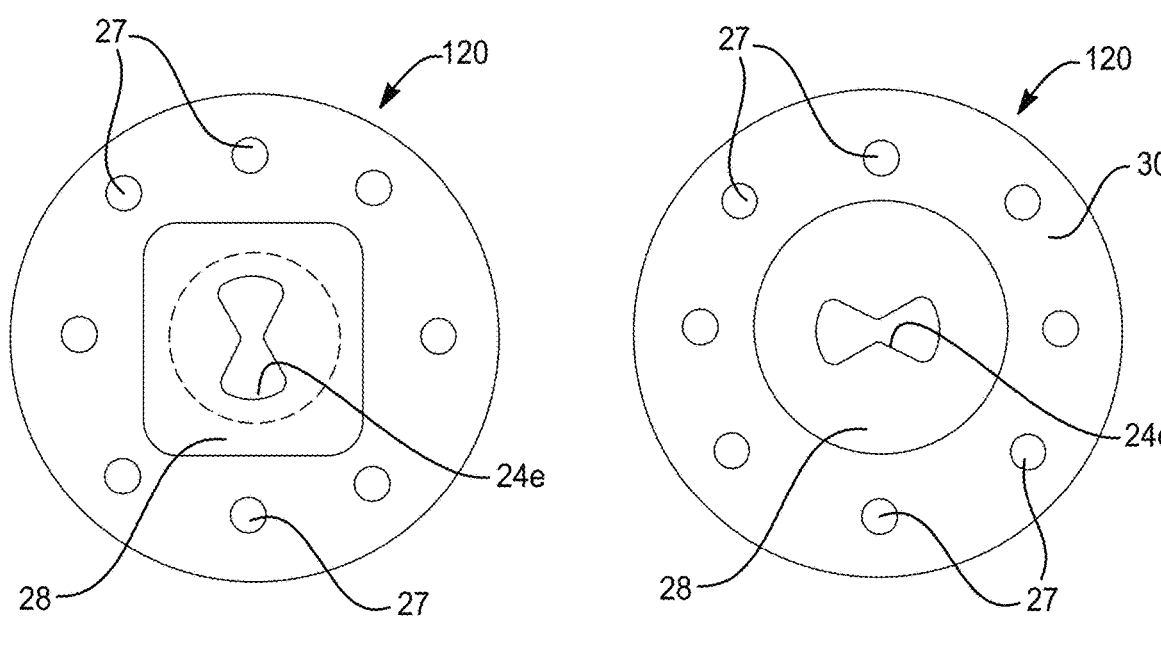
Figure 21A:
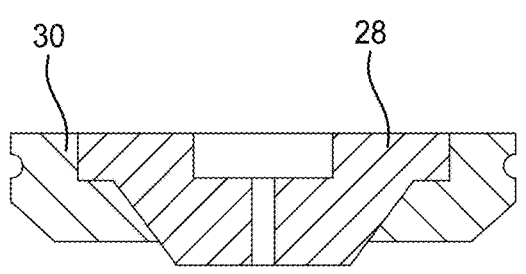
Figure 21B:
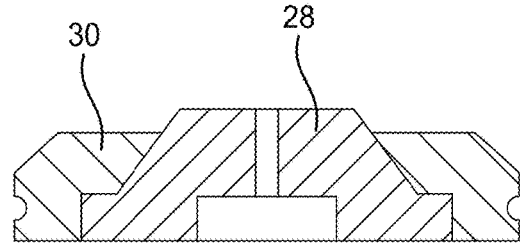
Figure 21C:
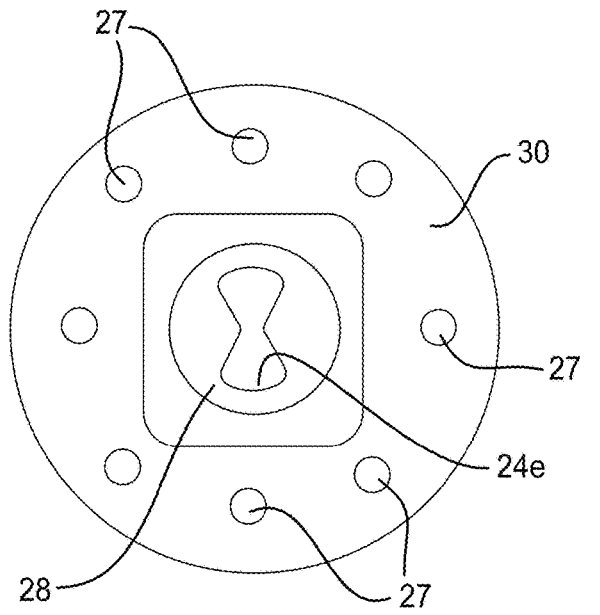
Figure 21D:
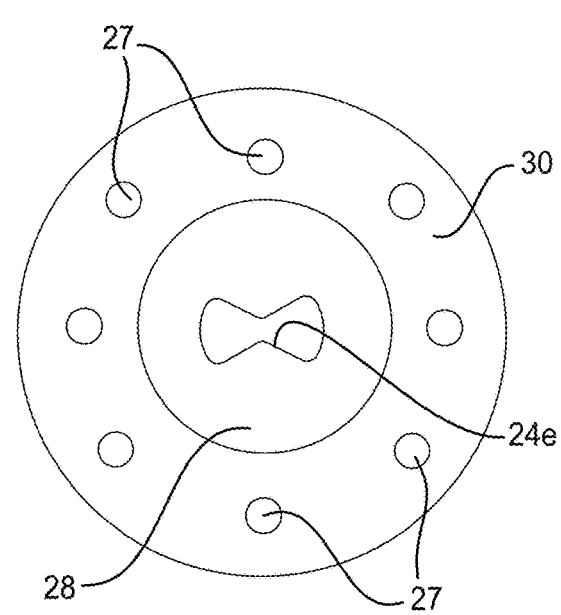
Figure 22A:
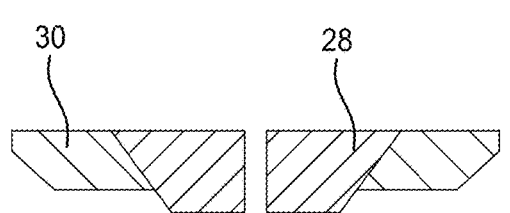
Figure 22B:
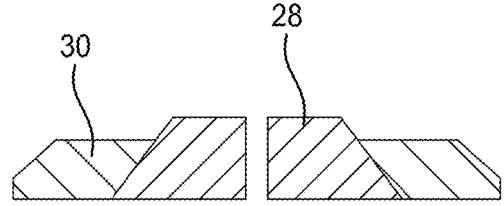
Figure 22C:
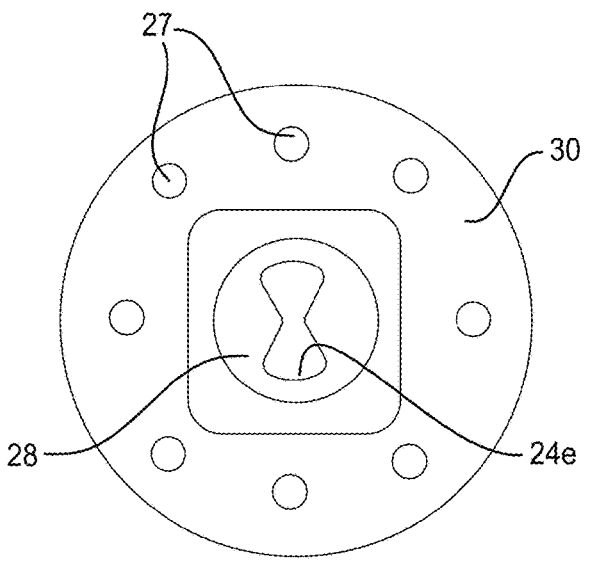
Figure 22D:
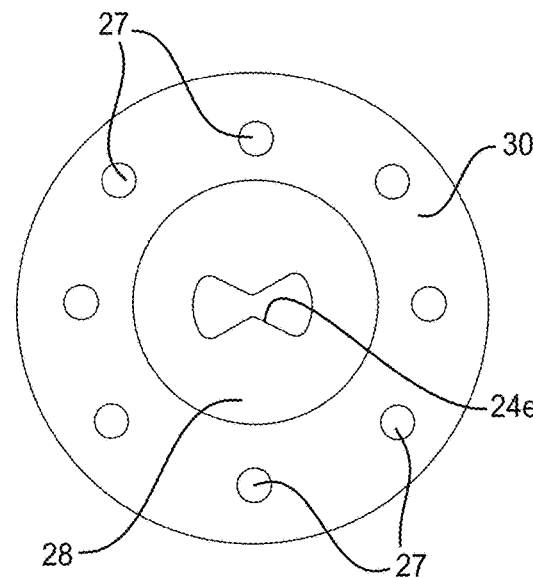
Figure 25:
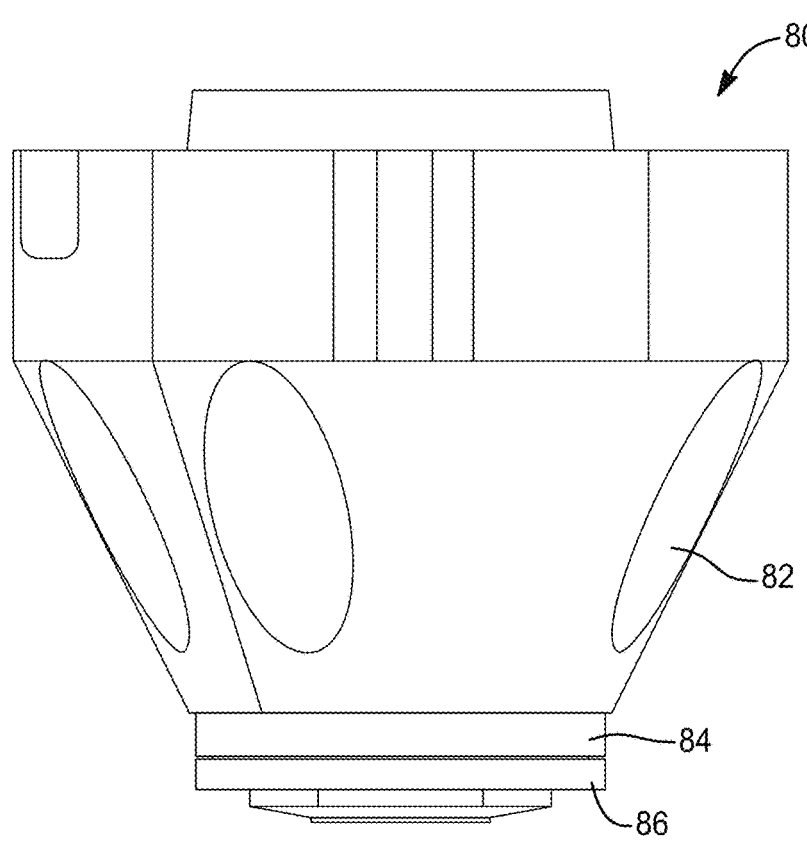
FIG. 25 illustrates a rotary extrusion die according to a further embodiment.
Figure 26:
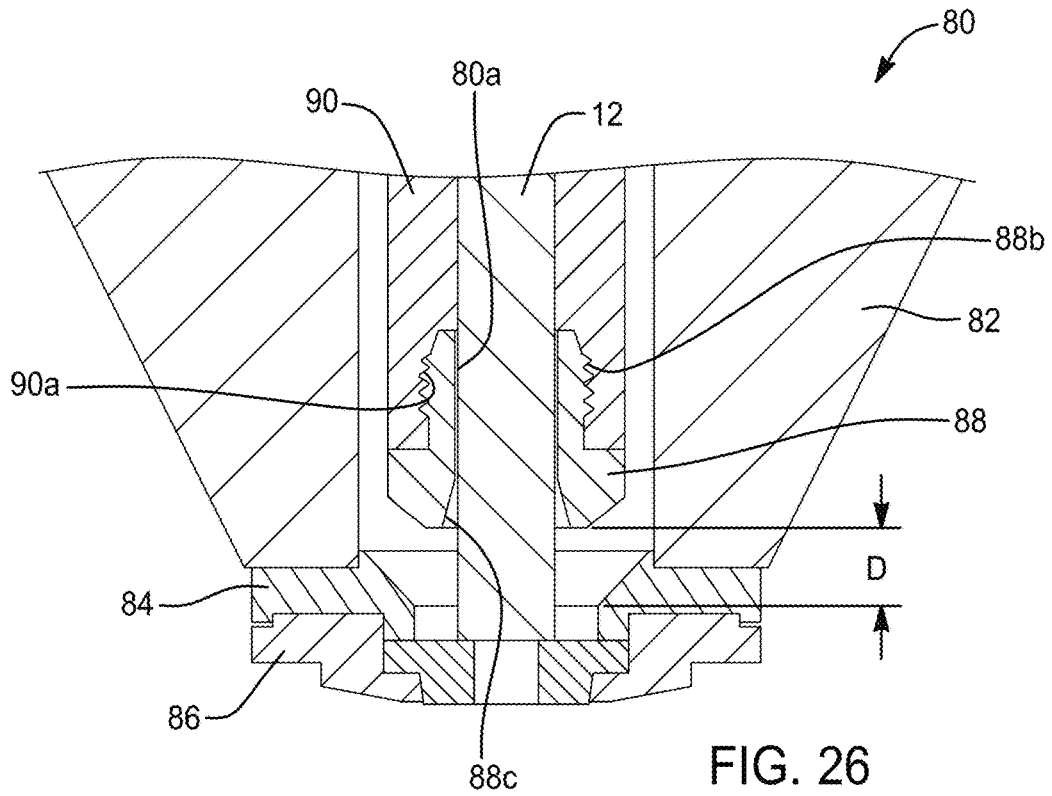
FIG. 26 is a cross-sectional view of the rotary extrusion die shown in FIG. 25.
Figures 29A, 29B, 30A, 30B:
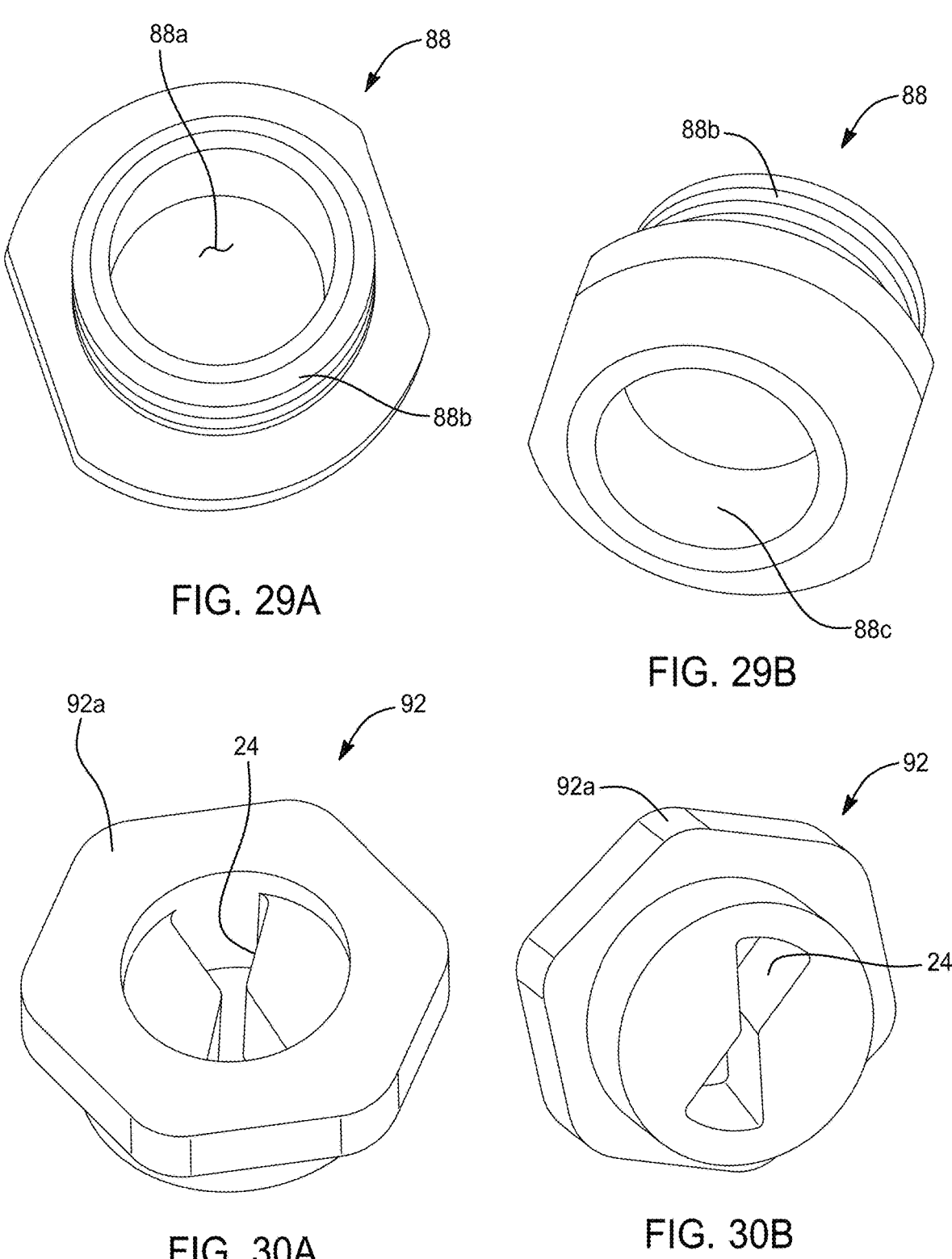
FIGS. 29A-29B are top and bottom perspective views, respectively, of an end nut of the rotary extrusion die shown in FIG. 25.
FIGS. 30A-30B are top and bottom perspective views, respectively, of a die insert of the rotary extrusion die shown in FIG. 25.

With reference to FIGS. 11A-11D, further alternative extrusion orifices 24g-24j are shown. As shown in FIG. 11A, the rotary extrusion die 20g is shown with a Y-shaped centered orifice 24g. As shown in FIG. 11B, the rotary extrusion die 20h is shown with three triangular orifices 24h each extending out from a center of the rotary extrusion die 20h. As shown in FIG. 11C, the rotary extrusion die 20i is shown with three off-centered elongated slot orifices 24i. As shown in FIG. 11D, the rotary extrusion die 20j is shown with three spaced triangular orifices 24j.

In some embodiments, such as but not limited to the feedstock material is hard steel or hard alloy, rotary extrusion die 20 can comprise special features on the leading edges of the profile of die orifice 24. In some embodiments, the leading edges of the die orifice 24 can be made of special hard materials, such as PCBN, PCD or SiC/D in a single-part die design or multi-part die design. FIGS. 12A-23B illustrate two-piece rotary extrusion dies 120 and include a die component 30 and an insert 28 received in an opening 32 in the die component 30. The opening 32 can have a square, rectangular or other polygonal shape. The die component 30 further can include the plurality of mounting apertures 27. The insert 28 has a complementary shape to the opening 32. The insert 28 includes the die orifice 24 which can be of the various shapes disclosed herein.

In the embodiment shown in FIGS. 16A-19E, the insert 28 includes straight stepped sidewalls 50 for receipt in an opening 32 with straight stepped sidewalls 52. In the embodiment shown in FIGS. 20A-20D, the insert 28 has a straight sidewall portion 54a combined with a tapered sidewall portion 54b for receipt in an opening with straight sidewall portions 56a combined with tapered sidewall portions 56b. In the embodiment shown in FIGS. 21A-21D, the insert 28 has a straight sidewall portion 58a combined with a stepped portion 58b and a tapered sidewall portion 58c for receipt in an opening with straight sidewall portions 60a combined with a stepped portion 60b and a tapered sidewall portions 60c. In the embodiment shown in FIGS. 22A-22D, the insert 28 includes tapered sidewalls 62 for receipt in an opening 32 with tapered sidewalls 64.

As illustrated in FIG. 23, for the shown rotation direction, the darkened leading edges are shown. In some embodiments, the backing material can be any tungsten-based material or very high-temperature alloys (high temperature steel, alumina, zirconia, SiC or Ni-based or any tungsten-based refractory materials). In some embodiments, the leading edges of the die orifice 24 can comprise a rake angle and/or curved features to provide stronger and improved extrusion. In some embodiments, materials having much higher hardness compared to the feedstock material 12 and that are capable of withstanding high temperature without losing strength are desirable, such as but not limited to PCBN, PCD, SiC/D. These materials can be cemented or die-casted with as an inner part or insert (FIGS. 12A-23B) or as an integral part. In particular, with reference to FIGS. 12A-23 insert 28 can be made of any refractory material (for example, Ni based or tungsten (W) based materials or any other material capable of high temperature without losing strength). An outer part or retainer 30 can be made of any material capable of withstanding high temperatures without losing strength (for example, high temperature steel, Ni-based or refractory based material).

In some embodiments, as illustrated in FIGS. 24A-24C, a ceramic washer 70 and/or retainer 30 can be provided. In addition to the die retainer 30 and insert 28, for the multi-part design, a retainer ring, and a ceramic washer 70 can be added to rotary extrusion die 20 assembly. The retainer ring 30 holds the insert at the specified location and prevents it from getting pushed upwards during the deposition of the material. It can be made of any high-temperature steel or high temperature refractory material or alloys. In some embodiments, the ceramic washer 70 prevents access heat to travel up into the spindle and provides thermal insulation. It can be made of any high-temperature ceramic (or refractory ceramic) insulator material.

With reference to FIGS. 25-30B, an extrusion die assembly 80 is shown with a spindle 82 connected to a retainer washer 84 and a die holder 86 that can be made from high temperature materials such as Tungsten Lanthanum (lanthanated tungsten) and/or Tungsten Rhenium alloys. An end nut 88 is received in an end of a feed channel 90 and includes an aperture 88a through the end nut for directing the feedstock to the extrusion die insert 92 that is supported by the die holder 86. The end nut 88 can include an external thread 88b that is in engagement with an internal thread 90a in the end of the feed channel 90. The end nut can include a tapered open end 88c that tapers away from the feedstock in a distal direction. The retainer washer 84 can include a cone shaped proximal (upper) surface 84a that is spaced from the feedstock. The die holder 86 can include a polygonal recess 86a for mating with a corresponding polygonal flange 92a of the extrusion die insert 92. The end nut 88 and the extrusion die insert 92 can be made of Tungsten Rhenium alloys such as W—Re, W-3Re, W-5Re, W-10Re, W-25Re, W-26Re, or W—ReHfC to be used with ferrous and harder metallic alloy feedstocks and it can be made with high strength steel or any other steel for aluminum or softer metallic alloy feedstocks. A distance "D" between a tip of the end nut 88 and the distal end of the cone shaped upper surface 84a of the retainer washer 84 can be between zero and one diameter of the feedstock 12. The extrusion die insert 92 can have any of the die orifice 24 shapes as disclosed herein. The end nut 88, the retainer washer 84 and the die insert 92 make the removal and maintenance of the extrusion die assembly 80 more manageable.

Figure 31:
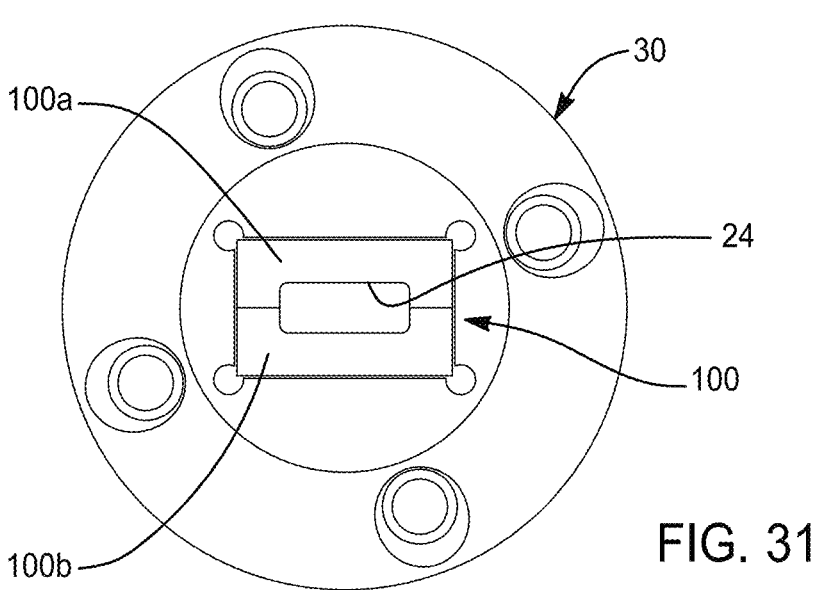
FIG. 31 is a top view of an extrusion die holder with a two-piece insert according to the principles of the present disclosure.
Figure 32:
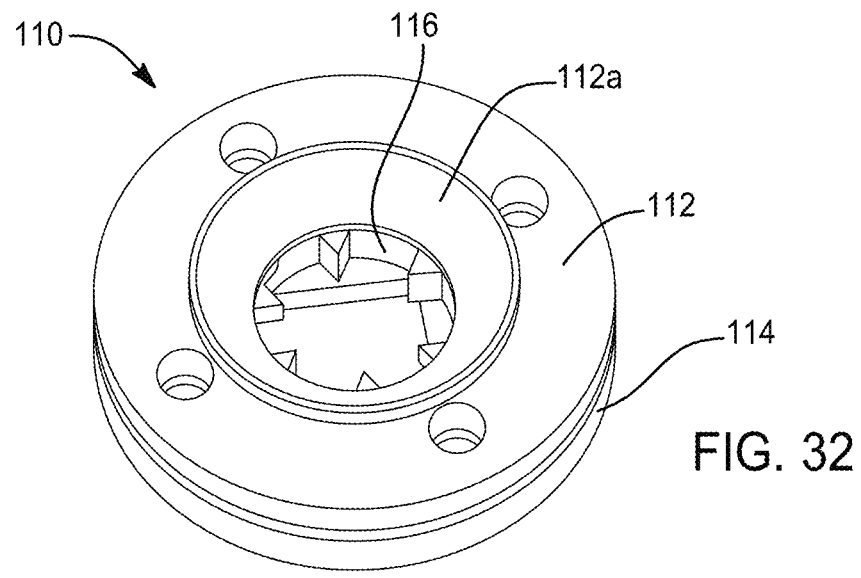
FIG. 32 is a perspective view of a nozzle and die tooling set with flash cutting features.
Figure 33:
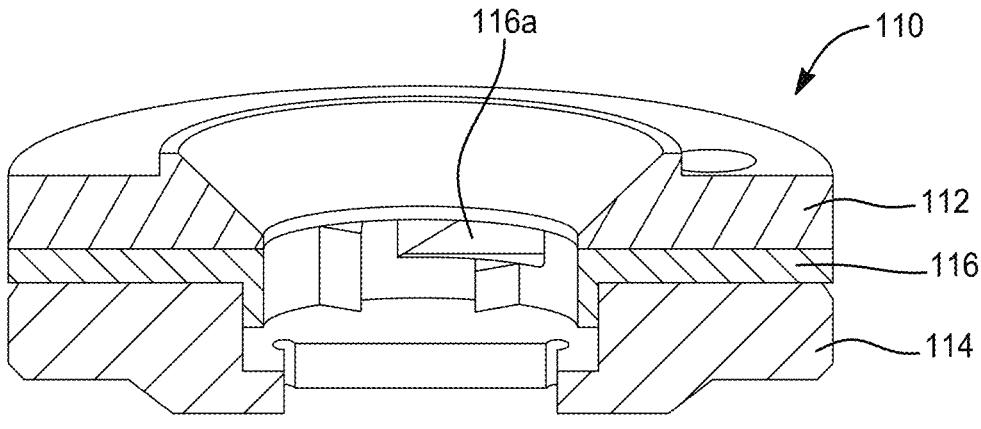
FIG. 33 is a cross-sectional view of the nozzle and die tooling set with flash cutting features.
Figures 34, 35, 36:
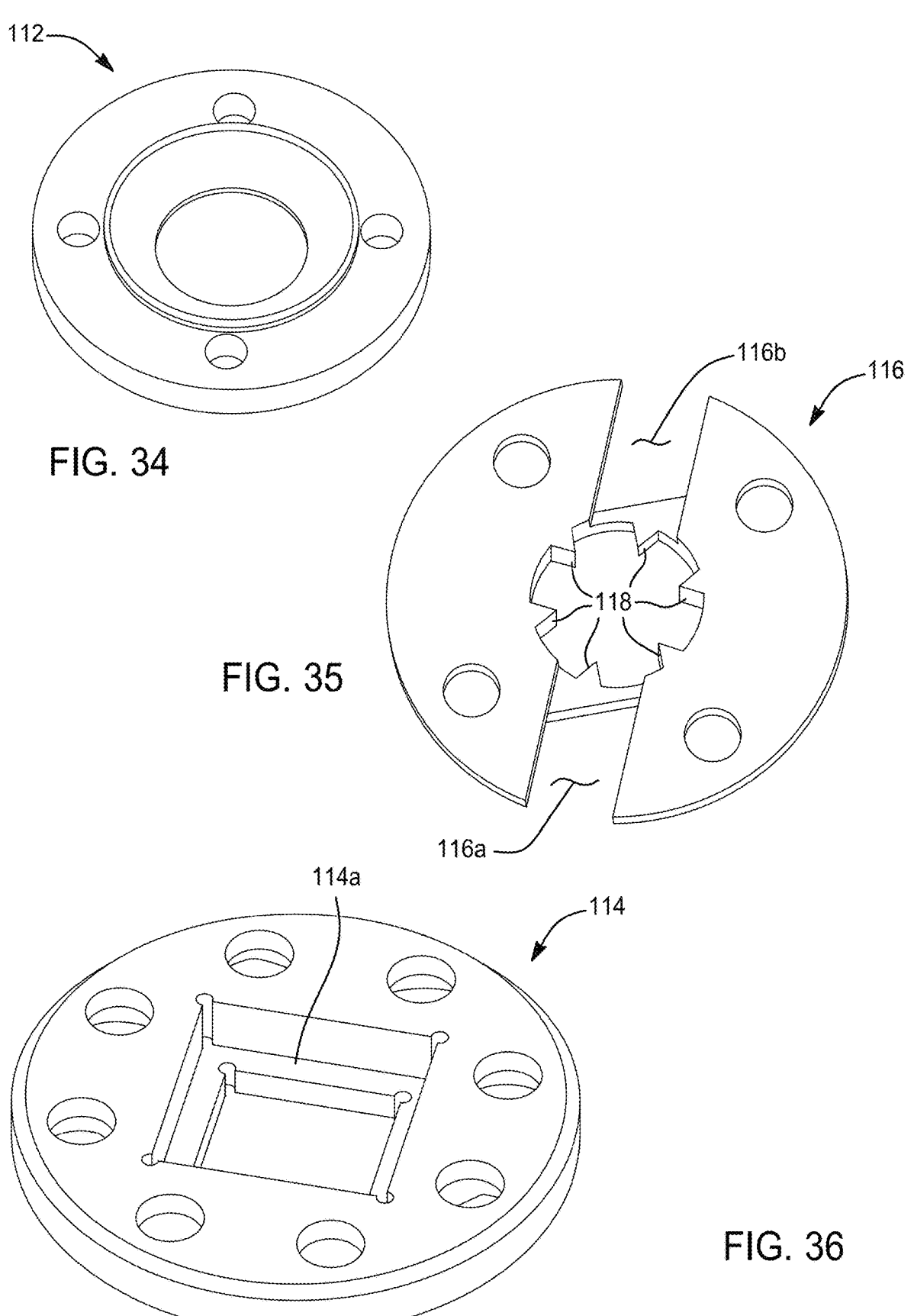
FIG. 34 is a top perspective view of the nozzle of the embodiment of FIG. 33.
FIG. 35 is a top perspective view of the flash cutting feature of the embodiment of FIG. 33.
FIG. 36 is a top perspective view of the die holder of the embodiment of FIG. 33.

With reference to FIG. 31, the extrusion die assembly is shown including a die component 30 and a two-piece insert 100 received in an opening 32 in the die component 30. The two piece insert 100 can include two segments (identical or otherwise) that together define a die orifice 24 of any of the shapes disclosed herein. In the embodiment shown the die orifice is an elongated slot that has half of the orifice 24 defined by each segment 100a, 100b. The two-piece insert 100 can be provided with strategic break lines to allow for easier assembly, disassembly and maintenance for re-use of the insert 100. The insert 100 can be made from WC, WLa, Wre, high strength steel or another cutting tool material.

With reference to FIGS. 32-36 an extrusion die assembly 110 with a flash cutting feature will now be described. The extrusion die assembly 110 is configured to be connected with a spindle. The extrusion die assembly 110 includes a retainer washer 112 and a die holder 114 connected together with a flash cutting feature 116 mounted therebetween. The retainer washer 112 can include a cone shaped proximal (upper) surface 112a that is radially spaced from the feedstock 12. The die holder 114 can include a polygonal recess 114a for mating with a corresponding polygonal flange of an extrusion die insert as disclosed herein. The flash cutting feature 116 is sandwiched between the retainer washer 112 and the die holder 114. The flash cutting feature 116 includes a plurality of radially inward projecting teeth 118 that project toward the feedstock 12. The flash cutting feature 116 can be formed as one piece as shown or as two pieces. The flash cutting feature 116 defines radial passages 116a that extend radially outward between the retainer washer 112 and the die holder 114. The radial passages 116a can be defined in a one-piece flash cutting feature 116 or can be between segments of a two-piece flash cutting feature. In a one-piece flash cutting feature, the teeth 118 can be disposed around a central aperture 116b. In operation, as the feedstock 12 is pressed toward the die insert and the feedstock is heated by friction, the feedstock can tend to "mushroom" or expand radially outward. The teeth 118 of the flash cutting feature 116 will cut away the radially expanding feedstock and the chips are expelled through the radial passages 116a. Accordingly, the flash cutting feature eliminates the problem of the feedstock expanding radially outward and plugging the cavity with the extrusion die assembly 110.

With reference to FIGS. 37-44 an extrusion die assembly 120 with a flash cutting feature according to an alternative embodiment will now be described. The extrusion die assembly 120 is configured to be connected with a spindle. The extrusion die assembly 120 includes a retainer washer 122 and a die holder 124 connected together with one or more flash cutting features 126 mounted therebetween. The retainer washer 122 can include a cone shaped proximal (upper) surface 122a that is radially spaced from the feedstock 12. The die holder 124 can include a polygonal recess 124a for mating with a corresponding polygonal flange 128a of an extrusion die insert 128. The retainer washer 122 includes recesses 122b and the die holder 124 includes corresponding recesses 124b for receiving the flash cutting features 126 therein. The flash cutting features 126 are sandwiched between the retainer washer 122 and the die holder 124. The flash cutting features 126 include a plurality of radially inward projecting teeth 126 that are separately clamped between the retainer washer 122 and the die holder 124 and project toward the feedstock 12. The flash cutting features 126 can be triangular, as shown in FIG. 44 or can have other shapes. It can be made of high strength steel, WC, WRe, WReHfC, PCBN, CBN, or any other refractory alloy, or high temperature high strength alloy. The retainer washer 122 and the die holder 124 can define a radial passage or passages 126a therebetween. An insert 132 is received in the die holder 124 and can include a die orifice of any shape as disclosed herein. In operation, as the feedstock 12 is pressed toward the die insert and the feedstock is heated by friction, the feedstock can tend to "mushroom" or expand radially outward. The flash cutting teeth 126 will cut away the radially expanding feedstock and the chips are expelled through the radial passages. Accordingly, the flash cutting feature 126 eliminates the problem of the feedstock expanding radially outward and plugging the cavity within the extrusion die assembly 120.

With reference to FIG. 45, an additive manufacturing system 10 according to the principles of the present disclosure is shown with a cooling accessory 140 surrounding the rotary extrusion die 20. The cooling accessory 140 can provide a liquid cooled environment around the rotary extrusion die 20. Alternatively, the cooling accessory 140 can provide a cooled liquid spray or mist on the rotary extrusion die 20. The cooling accessory can be used during an extrusion operation to control a temperature of the rotary extrusion die or can be used at the conclusion of an extrusion operation to cool the rotary extrusion die 20 more rapidly.

FIG. 46 is a schematic view of an additive manufacturing system 10 with a blower 150 providing cooling air or liquid nitrogen or liquid carbon dioxide or any other phase changing liquid/gas/media on the rotary extrusion die 20. The blower 150 can provide an air cooled environment around the rotary extrusion die 20. The blower 150 can be used during an extrusion operation to control a temperature of the rotary extrusion die or can be used at the conclusion of an extrusion operation to cool the rotary extrusion die 20 more rapidly.

FIG. 47 is a schematic view of an additive manufacturing system 10 with the rotary extrusion die 20 applying additive material to a substrate within a cooling bath 160 filled with water or other cooling liquid. The cooling bath 160 can be used to quickly quench the extruded metal deposited on the substrate and to also maintain the rotary extrusion die 20 at a desired temperature.

FIG. 48 is an exemplary graph of process parameters during an additive manufacturing process according to the principles of the present disclosure. The graph shows the rotational speed of the feedstock increasing initially and maintaining at increasing intervals during a pre-heating stage. The rotational speed during the pre-heating stage can be maintained constant or can be varied, as desired. For softer metallic feedstock such as aluminum and soft metallic alloys, the rotational speed can range from 100 to 5000 RPM. For harder metallic feedstock such as steel, stainless steel and other hard metallic alloys, the rotational speed can range from 50-10,000 RPM. During the pre-heating stage, the feed stock is preloaded at a desired pressure that can be constant as shown or that can vary over time. For softer metallic feedstock such as aluminum and soft metallic alloys, the preload pressure can range from 100 to 5000 psi. For harder metallic feedstock such as steel, stainless steel and other hard metallic alloys, the preload pressure can range from 100 to 10000 psi. The preheat time can range from 0-30 minutes. Once the feedstock 12 is heated to a desired extrusion temperature, a deposition process is implemented with a rod feed rate beginning that presses the feed stock through the die orifice 24 and applies it to the substrate at a desired rate. Alternatively, the feedstock can be placed under a continuous load. For softer metallic feedstock such as aluminum and soft metallic alloys, the feed rate can range from 1 to 2000 mm/min or at a continuous load of between 300-5000 psi. For harder metallic feedstock such as steel, stainless steel and other hard metallic alloys, the feed rate can range from 1 to 1000 mm/min or at a continuous load of between 300-20000 psi. The additive manufacturing process can have a printing velocity of between 1-5000 mm/min. When it is desired to halt the deposition process, the feed rate is reduced to zero and the load is removed while the rotational speed of the rotary extrusion die is reduced, as shown. The process parameters will change with the feedstock material and the size and diameter of the feedstock material.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An additive manufacturing system for additive manufacturing a feedstock material upon a substrate, the additive manufacturing system comprising:
   a feedstock supplying system including a stationary guide tube configured to supply the feedstock material; and
   a rotating extrusion die system having a drive system including a rotating spindle surrounding the stationary guide tube and an extrusion die member mounted to the rotating spindle, the rotating spindle being configured to rotate the extrusion die member relative to and in physical contact with the feedstock material to generate friction sufficient to locally heat and soften the stationary feedstock material, the rotating extrusion die member having an extrusion orifice through which the heated and softened feedstock material is extruded, wherein the extrusion die member does not contact the feedstock material at any tangential or circumferential surface of the feedstock material and the feedstock does not rotate in any case.

2. The additive manufacturing system according to claim 1 wherein the extrusion die member is spaced apart from the substrate.

3. The additive manufacturing system according to claim 1 wherein the extrusion die system having the rotating drive system is configured to rotate the extrusion die member relative to and in physical contact with the feedstock material to generate friction sufficient to locally heat the feedstock material to plasticize the feedstock material to provide malleable feedstock material to extrude and deposit through the extrusion orifice of the extrusion die member.

4. The additive manufacturing system according to claim 3, wherein the extrusion die member comprises an outer surface adjacent to the orifice, the outer surface configured to engage the extruded and deposited malleable feedstock material.

5. The additive manufacturing system according to claim 1, wherein he extrusion die member includes one of a bow-tie, dog bone and a Y-shaped orifice.

6. The additive manufacturing system according to claim 1, wherein the extrusion die member includes an off-center orifice.

7. The additive manufacturing system according to claim 1, wherein the extrusion die member includes a slot-shaped orifice.

8. The additive manufacturing system according to claim 1, wherein the feedstock has a square footprint.

9. The additive manufacturing system according to claim 1, wherein the feedstock has a circular footprint.

10. The additive manufacturing system according to claim 1, wherein the extrusion orifice includes plural orifices.

11. An additive manufacturing system for additive manufacturing a feedstock material upon a substrate, the additive manufacturing system comprising:

a feedstock supplying system configured to supply the feedstock material; and a rotating extrusion die system having a drive system configured to rotate an extrusion die member relative to and in physical contact with the feedstock material to generate friction sufficient to locally heat and soften the stationary feedstock material, the rotating extrusion die member having an extrusion orifice through which the heated and softened feedstock material is extruded, wherein the extrusion die member includes a die retainer having an opening therein and an insert received in the opening, the extrusion orifice extending through the insert, the insert being fixed for rotation with the extrusion die member.

12. The additive manufacturing system according to claim 11, wherein the die member includes a plurality of mounting apertures therein.

13. The additive manufacturing system according to claim 11, wherein the insert is two pieces.

14. The additive manufacturing system according to claim 1, wherein the extrusion die member is connected to the drive system by an insulating washer.

15. The additive manufacturing system according to claim 1, wherein the feedstock supplying system includes a channel with an end nut removably mounted to a distal end of the channel and having an aperture through which the feedstock is delivered.

16. An additive manufacturing system for additive manufacturing a feedstock material upon a substrate, the additive manufacturing system comprising:

a feedstock supplying system configured to supply the feedstock material; and a rotating extrusion die system having a drive system configured to rotate an extrusion die member relative to and in physical contact with the feedstock material to generate friction sufficient to locally heat and soften the stationary feedstock material, the rotating extrusion die member having an extrusion orifice through which the heated and softened feedstock material is extruded, wherein the feedstock supplying system includes a channel with an end nut removably mounted to a distal end of the channel and having an aperture through which the feedstock is delivered and a retainer washer opposing the end nut.

17. The additive manufacturing system according to claim 1, further comprising a flash cutting feature mounted to the rotary extrusion die system.

18. An additive manufacturing system for additive manufacturing a feedstock material upon a substrate, the additive manufacturing system comprising:

a feedstock supplying system configured to supply the feedstock material; and a rotating extrusion die system having a drive system configured to rotate an extrusion die member relative to and in physical contact with the feedstock material to generate friction sufficient to locally heat and soften the stationary feedstock material, the rotating extrusion die member having an extrusion orifice through which the heated and softened feedstock material is extruded; and a flash cutting feature mounted to the rotary extrusion die system, wherein the flash cutting feature includes a radial passage.

19. The additive manufacturing system according to claim 1, wherein the rotary extrusion die system includes one of a liquid, gas, or air cooled system.

* * * * *